US012567921B1

(12) United States Patent
Syrivelis et al.

(10) Patent No.: US 12,567,921 B1
(45) Date of Patent: Mar. 3, 2026

(54) LANE SCRAMBLING OVER NETWORK COMMUNICATION CHANNELS

(71) Applicant: MELLANOX TECHNOLOGIES, LTD., Yokneam (IL)

(72) Inventors: Dimitrios Syrivelis, Volos (GR); Paraskevas Bakopoulos, Ilion (GR); Ioannis (Giannis) Patronas, Piraeus (GR); Dimitrios Kalavrouziotis, Papagou (GR); Nikolaos Argyris, Zografou (GR); Elad Mentovich, Tel Aviv (IL)

(73) Assignee: Mellanox Technologies, Ltd., Yokneam (IL)

( * ) Notice: Subject to any disclaimer, the term of this patent is extended or adjusted under 35 U.S.C. 154(b) by 40 days.

(21) Appl. No.: 18/828,315

(22) Filed: Sep. 9, 2024

(30) Foreign Application Priority Data

Sep. 4, 2024 (GR) .............................. 20240100609

(51) Int. Cl.
H04K 1/02 (2006.01)

(52) U.S. Cl.
CPC ...................................... H04K 1/02 (2013.01)

(58) Field of Classification Search
CPC ........................................................ H04K 1/02
See application file for complete search history.

(56) References Cited

U.S. PATENT DOCUMENTS 11,838,874 B2 * 12/2023 Xu ...................... H04W 52/242
11,871,222 B1 * 1/2024 Feng ..................... H04L 67/104
11,924,738 B1 * 3/2024 Choi .................. H04L 61/5069
11,936,525 B2 * 3/2024 Kunz ...................... H04W 4/40
12,289,335 B2 * 4/2025 Gazit ................. H04L 63/1416
2006/0285848 A1 12/2006 Lee et al.
2011/0206203 A1 8/2011 Voruganti et al.
2018/0041332 A1 * 2/2018 Yang ..................... H04J 3/0658
2020/0244397 A1 * 7/2020 Iyer ........................ H04L 1/0075
2023/0115533 A1 * 4/2023 Meaney ................ G06F 13/385 714/5.1
2023/0333852 A1 * 10/2023 Kim ...................... G06F 9/5038
2023/0409520 A1 * 12/2023 Wang ...................... G06F 8/433
2024/0039627 A1 2/2024 Bakopoulos et al.
2024/0113943 A1 4/2024 Patronas et al.
2024/0187440 A1 6/2024 Patronas et al.

* cited by examiner

Primary Examiner — Viral S Lakhia
(74) Attorney, Agent, or Firm — Moore & Van Allen PLLC; Will Walters

(57) ABSTRACT

Apparatuses, methods, and systems are provided for lane scrambling over network communication channels. The apparatus includes processing circuitry configured to configure a first selector and a second selector according to a first configuration. The processing circuitry is further configured to transmit a plurality of pre-computed lane permutations to the first selector and transmit a selector signal to the first selector, wherein the selector signal indicates a pre-computed lane permutation from the plurality of pre-computed lane permutations for use as the first configuration. The processing circuitry is further configured to direct transmission of a response signal from the second selector to the first selector.

31 Claims, 11 Drawing Sheets

LANE SCRAMBLING OVER NETWORK COMMUNICATION CHANNELS

CROSS-REFERENCE TO RELATED APPLICATION

This application claims priority to Application No. 20240100609, filed on Sep. 4, 2024, in Greece, the entirety of which is incorporated by reference herein.

TECHNOLOGICAL FIELD

Example embodiments of the present disclosure relate generally to lane assignment for data streams.

BACKGROUND

Modern networking solutions must be able to handle large volumes of data transfer without compromising security of the transfer. Security breaches can occur when third parties attempt to intercept or otherwise interfere with data that is being transmitted between two endpoints. Applicant has identified numerous deficiencies and problems associated with conventional processes for transferring data. Through applied effort, ingenuity, and innovation, many of these identified problems have been solved by developing solutions that are included in embodiments of the present disclosure, many examples of which are described in detail herein.

GENERAL DESCRIPTION

Embodiments of the present disclosure are directed to lane scrambling of a data stream in a serializer-deserializer (SerDES) stack. A need exists to safely and effectively transfer data in spite of emerging threats to data infrastructure systems. As such, embodiments of the disclosure described herein may include lane scrambling over network communication channels. As described in further detail below, embodiments of the disclosure may scramble and re-order communication channels at the endpoints of a SerDES stack.

In some embodiments, an apparatus configured to scramble communications in a SerDES stack is provided. The apparatus may include a network interface operatively coupled to a communication network. The apparatus may include processing circuitry operatively coupled to the network interface and configured to communicate with a first selector associated with a transmitter and a second selector associated with a receiver via the communication network. In some embodiments, the first selector and the second selector may be configured to direct transmission of data therebetween via a plurality of lanes.

In some embodiments, the processing circuitry may be configured to configure the first selector according to a first configuration, wherein the transmitter is configured to transmit deserialized data to the first selector for transmission as a set of data streams to the second selector. In some embodiments, the first configuration may define an assignment of each data stream of the set of data streams to a corresponding lane of a plurality of lanes for transmission. Further, in some embodiments, the processing circuitry may configure the second selector according to the first configuration, wherein the set of data streams transmitted via the plurality of lanes according to the first configuration of the first selector is re-ordered via the second selector configured according to the first configuration to form the deserialized data for serialization by the receiver.

In some embodiments, the first configuration may be a current configuration. In some embodiments, the processing circuitry may be configured to configure the first selector according to a new configuration, wherein the new configuration defines a new assignment of each data stream of the set of data streams to a corresponding lane of the plurality of lanes for transmission. Further, in some embodiments, the processing circuitry may configure the second selector according to the new configuration, wherein the set of data streams transmitted via the plurality of lanes according to the new configuration of the first selector is re-ordered via the second selector configured according to the new configuration to form the deserialized data for serialization by the receiver.

In some embodiments, the processing circuitry may delay configuration of the first selector according to the new configuration until a time at which the set of data streams transmitted according to the current configuration is re-ordered via the second selector configured according to the current configuration.

In some embodiments, the configuration of the first selector may be changed from the current configuration to the new configuration based on a trigger. In some embodiments, the trigger may include a determination that a third-party device is operatively coupled to the communication network, a passage of time, or a triggering algorithm.

In some embodiments, the processing circuitry may be configured to transmit a plurality of pre-computed lane permutations to the first selector, wherein the first selector is configured to store the plurality of pre-computed lane permutations. Further, in some embodiments, the processing circuitry may be configured to transmit a selector signal to the first selector, wherein the selector signal indicates a pre-computed lane permutation from the plurality of pre-computed lane permutations for use as the first configuration.

In some embodiments, the plurality of pre-computed lane permutations is transmitted via a first signal type and the selector signal is transmitted via a second signal type.

In some embodiments, the first selector and the second selector may include a switching algorithm, wherein the switching algorithm configures the first selector and the second selector according to the first configuration, and wherein the switching algorithm is stored in the first selector and the second selector.

In some embodiments, in response to receipt of the data at the second selector, the processing circuitry may be configured to direct transmission of a response signal from the second selector to the first selector.

In some embodiments, the processing circuitry may be configured to determine that a third-party device is operatively coupled to the communication network based on the response signal received at the first selector.

In some embodiments, the processing circuitry may be configured to, upon a determination that the third-party device is operatively coupled to the communication network, cease transmission of data from the first selector to the second selector.

In some embodiments, the processing circuitry may be further configured to configure the first selector according to a second configuration, wherein the second configuration defines a new assignment of each data stream of the set of data streams to a corresponding lane of the plurality of lanes for transmission. In some embodiments the processing circuitry may be further configured to configure the second selector according to the second configuration and restart transmission of data from the first selector to the second selector via the plurality of lanes.

In some embodiments, the processing circuitry may be further configured to determine a location of an operative coupling of the third-party device to the communication network.

In some embodiments, the plurality of lanes may be provided via differential cable pairs.

In some embodiments, the plurality of lanes may be provided via a fiber optic cable.

In other embodiments, a method may configure a first selector associated with a transmitter according to a first configuration, wherein the transmitter is configured to transmit deserialized data to the first selector for transmission as a set of data streams to a receiver, and wherein the first configuration defines an assignment of each data stream of the set of data streams to a corresponding lane of a plurality of lanes for transmission. In some embodiments, data may be transmitted from the first selector to a second selector via a plurality of lanes. In some embodiments, the method may include configuring a second selector from the first selector to a second selector via a plurality of lanes. In some embodiments, the set of data streams transmitted via the plurality of lanes according to the first configuration of the first selector is re-ordered via the second selector configuration according to the first configuration to form the deserialized data for serialization by the receiver.

In some embodiments, wherein the first configuration is a current configuration, the method may further include configuring the first selector according to a new configuration, wherein the new configuration defines a new assignment of each data stream of the set of data streams to a corresponding lane of the plurality of lanes for transmission. Further, in some embodiments, the method may further include configuring the second selector according to the new configuration, wherein the set of data streams transmitted via the plurality of lanes according to the new configuration of the first selector is re-ordered via the second selector configured according to the new configuration to form the deserialized data for serialization by the receiver.

In some embodiments, the method may further include delaying configuration of the first selector according to the new configuration until a time at which the set of data streams transmitted according to the current configuration is re-ordered via the second selector configuration according to the current configuration.

In some embodiments, the configuration of the first selector may be changed from the current configuration to the new configuration based on a trigger. In some embodiments, the trigger may include at least one of a determination that a third-party device is operatively coupled to the communication network, a passage of time, or a triggering algorithm.

In some embodiments, the method may further include transmitting a plurality of pre-computed lane permutations to the first selector, wherein the first selector is configured to store the plurality of pre-computed lane permutations. In some embodiments, the method may further include transmitting a selector signal to the first selector, wherein the selector signal indicates a pre-computed lane permutation from the plurality of pre-computed lane permutations for use as the first configuration.

In some embodiments, the first selector and the second selector comprise a switching algorithm, wherein the switching algorithm configures the first selector and the second selector according to the first configuration, and wherein the switching algorithm is stored in the first selector and in the second selector.

In some embodiments, in response to receipt of the data at the second selector, the method may further include directing transmission of a response signal from the second selector to the first selector. Further, in some embodiments, the method may further include determining that a third-party device is operatively coupled to the communication network based on the response signal received at the first selector. Further, in some embodiments, the method may include ceasing transmission of data from the first selector to the second selector.

In some embodiments, the method may further include configuring the first selector according to a second configuration, wherein the second configuration defines a new assignment of each data stream of the set of data streams to a corresponding lane of the plurality of lanes for transmission. In some embodiments, the method may further include configuring the second selector according to the second configuration. In some embodiments, the method may further include restarting transmission of data from the first selector to the second selector via the plurality of lanes.

In some embodiments, a system is provided herein. In some embodiments, the system may include a first selector associated with a transmitter operatively coupled to a communication network. In some embodiments, the system may include a second selector associated with a receiver operatively coupled to the communication network, wherein the first selector and the second selector are configured to direct transmission of data therebetween via a plurality of lanes. In some embodiments, the system may include a permutation shift orchestrator (PSO) operatively coupled to the communication network, wherein the PSO comprises a processor and a memory including computer program code. In some embodiments, the memory and the computer program code configured to, with the processor, may cause the PSO to configure the first selector according to a first configuration, wherein the transmitter is configured to transmit deserialized data to the first selector for transmission as a set of data streams to the second selector, and wherein the first configuration defines an assignment of each data stream of the set of data streams to a corresponding lane of a plurality of lanes for transmission. In some embodiments, the system may cause the PSO to configure the second selector according to the first configuration, wherein the set of data streams transmitted via the plurality of lanes according to the first configuration of the first selector is re-ordered via the second selector configured according to the first configuration to form the deserialized data for serialization by the receiver.

In some embodiments, the memory and the computer program code are configured to, with the processor, cause the PSO to delay configuration of the first selector according to the new configuration until a time at which the set of data streams transmitted according to the current configuration is re-ordered via the second selector configured according to the current configuration.

In some embodiments, the configuration of the first selector may be changed from the current configuration to the new configuration based on a trigger. In some embodiments, the trigger may include at least one of a determination that a third-party device is operatively coupled to the communication network, a passage of time, or a triggering algorithm.

In some embodiments, the memory and the program code may be configured to, with the processor, cause the PSO to transmit a plurality of pre-computed lane permutations to the first selector, wherein the first selector is configured to store the plurality of pre-computed lane permutations. In some embodiments, the memory and the program code may be configured to, with the processor, cause the PSO to transmit a selector signal to the first selector, wherein the selector signal indicates a pre-computed lane permutation from the plurality of pre-computed lane permutations for use as the first configuration.

In some embodiments, the first selector and the second selector comprise a switching algorithm, wherein the switching algorithm configures the first selector and the second selector according to the first configuration, and wherein the switching algorithm is stored in the first selector and in the second selector.

In some embodiments, in response to receipt of the data at the second selector, the memory and the computer program code are configured to, with the processor, cause the PSO to direct transmission of a response signal from the second selector to the first selector. Further, in some embodiments, in response to receipt of the data at the second selector, the memory and the computer program code are configured to, with the processor, cause the PSO determine that a third-party device is operatively coupled to the communication network based on the response signal received at the first selector. Further, in some embodiments, in response to receipt of the data at the second selector, the memory and the computer program code are configured to, with the processor, cause the PSO cease transmission of data from the first selector to the second selector.

In some embodiments, the memory and the computer program code are configured to, with the processor, cause the PSO to configure the first selector according to a second configuration, wherein the second configuration defines a new assignment of each data stream of the set of data streams to a corresponding lane of the plurality of lanes for transmission. In some embodiments, the memory and the computer program code are configured to, with the processor, cause the PSO to configure the second selector according to the second configuration. In some embodiments, the memory and the computer program code are configured to, with the processor, cause the PSO to restart transmission of data from the first selector to the second selector via the plurality of lanes.

In some embodiments, a communication circuitry is provided. In some embodiments, the communication circuitry may include a network interface operatively coupled to a communication network, wherein the communication circuitry is configured to communicate with a first selector associated with a transmitter and a second selector associated with a receiver via the communication network, wherein the first selector and the second selector are configured to direct transmission of data therebetween via a plurality of lanes. In some embodiments, the communication circuitry may be configured to, via processing circuitry, configure the first selector according to a first configuration, wherein the transmitter is configured to transmit deserialized data to the first selector for transmission as a set of data streams to the second selector, and wherein the first configuration defines an assignment of each data stream of the set of data streams to a corresponding lane of a plurality of lanes for transmission. In some embodiments, the communication circuitry may be configured to, via processing circuitry, configure the second selector according to the first configuration, wherein the set of data streams transmitted via the plurality of lanes according to the first configuration of the first selector is re-ordered via the second selector configured according to the first configuration to form the deserialized data for serialization by the receiver.

In some embodiments, the first configuration may be a current configuration. In some embodiments, the communication circuitry may be configured to, via the processing circuitry, configure the first selector according to a new configuration, wherein the new configuration defines a new assignment of each data stream of the set of data streams to a corresponding lane of the plurality of lanes for transmission. In some embodiments, the communication circuitry may be configured to, via the processing circuitry, configure the second selector according to the new configuration, wherein the set of data streams transmitted via the plurality of lanes according to the new configuration of the first selector is re-ordered via the second selector configured according to the new configuration to form the deserialized data for serialization by the receiver.

In some embodiments, the communication circuitry, via the processing circuitry, is further configured to delay configuration of the first selector according to the new configuration until a time at which the set of data streams transmitted according to the current configuration is re-ordered via the second selector configured according to the current configuration.

In some embodiments, the configuration of the first selector is changed from the current configuration to the new configuration based on a trigger. In some embodiments, the trigger may include at least one of a determination that a third-party device is operatively coupled to the communication network, a passage of time, or a triggering algorithm.

In some embodiments, the communication circuitry, via the processing circuitry, is further configured to transmit a plurality of pre-computed lane permutations to the first selector, wherein the first selector is configured to store the plurality of pre-computed lane permutations. In some embodiments, the communication circuitry, via the processing circuitry, is further configured to transmit a selector signal to the first selector, wherein the selector signal indicates a pre-computed lane permutation from the plurality of pre-computed lane permutations for use as the first configuration.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Figure 1A:
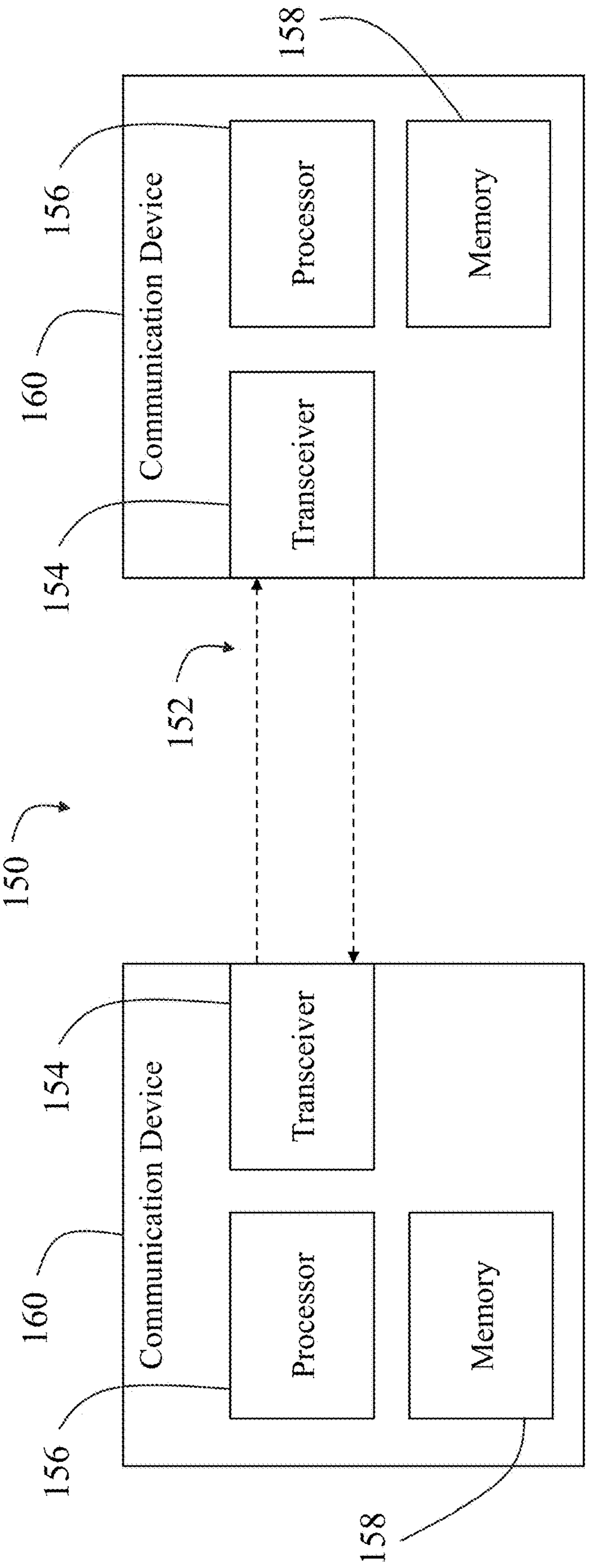
FIG. 1A is a block diagram schematically illustrating a communication channel in accordance with some embodiments described herein.

Embodiments of the present disclosure now will be described more fully hereinafter with reference to the accompanying drawings in which some but not all embodiments are shown. Indeed, the present disclosure may be embodied in many different forms and should not be construed as limited to the embodiments set forth herein; rather, these embodiments are provided so that this disclosure will satisfy applicable legal requirements. Like numbers refer to like elements throughout. As used herein, terms such as "front," "rear," "top," "bottom," "side," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Furthermore, when it is said herein that something is "based on" something else, it may be based on one or more other things as well. In other words, unless expressly indicated otherwise, as used herein "based on" means "based at least in part on" or "based at least partially on." Also, as used herein, the term "or" is intended to be inclusive when used in a series and may be used interchangeably with "and/or," unless explicitly stated otherwise (e.g., if used in combination with "either" or "only one of"). No element, act, or instruction used herein should be construed as critical or essential unless explicitly described as such.

The present disclosure as provided herein may include a first selector connected to a transmitter and a second selector connected to a receiver. The transmitter be configured to deserialize a data stream, while the receiver may be configured to serialize the data. The first selector may be configured to generate lane assignments for the deserialized data (e.g., scramble the data) with the second selector being configured to re-order the data back into its deserialized form (e.g., reversing the lane scrambling). A permutation shift orchestrator (PSO) may configure the selectors to periodically change the lane assignments to scramble the transmission of data to keep the lane scrambling unpredictable throughout the data transmission. For example, the PSO may periodically configure the selectors based on a first configuration, a second configuration, a third configuration, and so on. In addition, the PSO may delay reconfiguring the selectors until the data configured according to the previous configuration is received at the second selector.

With ever-growing network bandwidth and latency requirements, multi-lane SerDES architecture is the de facto standard architecture to materialize communication channels between NICs, switches, and even peripherals that communicate within the server boundaries (e.g. PCIe). In a state-of-the-art SerDES stack (e.g., multi-late SerDES architecture), traffic is typically streamed over 4 or 8 lanes. If the transfer medium is copper, the lane is served by a dedicated differential cable pair, whereas in the case of fiber medium, the lanes may be assigned a different wavelength and use the same fiber.

In multi-lane SerDES architecture, each lane is assigned to transfer a portion of the parallel data-flit that gets serialized at the Parallel In-Serial Out (PISO) stage of the hardware pipeline. For example, an environment includes a 64-Byte (512-bit) hardware data path width up to the PISO SerDES stage, then with 4-lane serialization, lane 0 will haul the serialized version of the most significant 16-bytes, lane1 will haul the next range (e.g., second most significant) of 16-bytes, lane 2 will haul the next range, and lane 3 will haul the least significant 16-bytes of the data-flit. Accordingly, the data-flit gets reassembled at the destination (Rx) at the Serial-In-Parallel-Out (SIPO) stage for the SerDES pipeline.

In conventional systems, the SerDES lane data are scrambled to deliver good DC balance (adequate switching between 1' and 0's). This allows lane data recovery if the link is tapped by an adversary. For this reason, data confidentiality between two legitimate endpoints of the network needs to be provided at a higher layer. Nevertheless, in conventional systems, man-in-the-middle attacks can materialize when an adversary device is acting as a legitimate endpoint in the network where the rest of devices may connect to and initiate secure tunnels. A man-in-the-middle attack is a common attack that is easy to carry out, if the adversary manages to physically interface the malicious device to the network.

The disclosure provided herein introduces a physical layer network protection mechanism that hinders man-in-the-middle attacks by making the physical attachment of the adversary device very challenging, close to impossible. One or more switches that are in a secure datacenter area and are co-located with servers that require protection may act as egress and ingress points of a domain described as a "Network Lane Scrambling Domain". This domain may include 2 or more switching layers and can be deployed over unprotected areas (e.g., interconnecting 2 or more datacenters).

The approach is applicable to optical networks that feature optical circuit switching elements and can carry out physical topology reconfiguration at runtime. As mentioned in the example above, a 4-lane Tx-Rx communication pair between two commodity optical transceiver may explain the internals, but the approach can be scaled to full optical network deployment.

Currently, conventional networks face many issues surrounding securing data transmission throughout the network. A common tactic for malicious individuals is to use what is called a "man-in-the-middle" attack, which is when a malicious device is connected to the network in an attempt to read or tamper with the data flowing throughout the network. The malicious device may disguise itself as a legitimate end-point or device order to gain the trust of other devices on the network. Therefore, a need exists to scramble the communication lanes over a network.

The present disclosure provides a solution to scrambling lane permutations, or link permutations, throughout a network. The network may include an optical network or a standard network using dedicated differential cable pairs to transmit the data. Initially, the data streams may be deserialized, or distributed into parallel lane assignments, by a transmitter. The deserialized data streams may then be scrambled by a switch or a selector, which organizes the parallel lane assignments of the data. The selector may interface with optical networks (e.g., via optical selectors) or traditional networks (e.g., via switches). This allows the selector to be reconfigured during runtime and features physical topology reconfigurations via the switches.

Further, the present disclosure takes advantage of the switch runtime circuit reconfigurability (either at wavelength level in a single fiber or at physical link level across multiple fibers). In this way, the disclosure may periodically switch the link permutations in the switches (e.g., selectors) which causes the lane traffic to become scrambled. The selectors may be positioned near the end-points of the network, for example, near the transmitter and the receiver. The link permutations may be agreed upon at the end-point selectors so that the selector on the receiver side may remedy the data scrambled by the transmitter side selector (e.g., un-scramble the data). The area protected by the end-point selectors may be referred to as a Network Lane Scrambling Domain. Any number of Network Lane Scrambling Domains may be connected together in order to protect networking environments, such as datacenters, data warehouses, or the like.

Additionally, the present disclosure provides that a malicious device performing a man-in-the-middle attack can be attached in the Network Lane Scrambling Domain, and therefore, the malicious device will need to determine the transmission side lane order, which may periodically change. In this regard, the malicious device may only receive different bit ranges of the dataflit (e.g., the transferred data) at different times. Further, because the dataflit-to-lane mapping is a convention of the endpoint selectors and does not contain any in-band stream identifiers, it is very difficult for the malicious device to determine the correct lane permutation. In addition, differing combinations may produce seemingly legitimate dataflit, leaving no indication on which order is correct. In addition, given that SerDES is an active channel with very stringent timing requirements, it is almost impossible for the adversary to figure out the correct order on time (or guess the correct dataflits at all times), so eventually the SerDES link will collapse, as critical in-band messages like clock compensation and link-layer retransmission will become obfuscated. Notably, for an 8-lane SerDES, the adversary needs to deal with intractable complexity.

The terms "communication channel," may refer to any mechanism, structure (e.g., or absence thereof), or the like through which information-based communications may propagate or otherwise travel. Referring initially to FIG. 1A, for example, a communication system 150 is depicted in which two communication devices 160 are configured to exchange electronic communications (e.g., packet-based communications) with one another over a communication channel 152. The communication channel 152 may include or be part of a communication network.

Illustratively, but without limitation, the communication devices 160 may correspond to network devices. As such, the communication devices 160 may correspond to any type of device that becomes part of or is connected with a communication network. Examples of suitable devices that may act or operate as a communication device 160 as described herein include, without limitation, one or more of a Personal Computer (PC), a laptop, a tablet, a smartphone, a server, a collection of servers, a networking card, an edge router, a switch, Network Interface Cards, a Top of Rack (ToR) switch, a server blade, or the like. As will be described in further detail herein, the communication device 160 may include a transceiver 154, a processor 156, and/or a memory 158. The transceiver 154 may include hardware that enables communications over the communication channel 152 whereas the processor 156 and memory 158 may include components that enable the communication device 160 to provide a desired functionality or perform certain functions.

The communication channel 152 may traverse a datacenter or any type of communication network (whether trusted or untrusted). Examples of a communication network that may be used to connect communication devices 160 and support the communication channel 152 include, without limitation, an Internet Protocol (IP) network, an Ethernet network, an InfiniBand (IB) network, a Fibre Channel network, the Internet, a cellular communication network, a wireless communication network, combinations thereof (e.g., Fibre Channel over Ethernet), variants thereof, and/or the like. In one specific, but non-limiting example, the communication network enables data transmission between the communication devices 160 using optical signals. In this case, the communication devices 160 and/or the communication network may include waveguides (e.g., optical fibers) that carry the optical signals.

The transceiver 154 may include electrical components, optical components, or combinations thereof that facilitate communications over the communication channel 152. The components of the transceiver 154 may be coupled to the processor 156. Data, electrical signals, or the like may be exchanged between the transceiver 154 and processor 156. In some embodiments, the processor 156 may utilize the transceiver 154 to transmit data packets to a remote communication device 160 via the communication channel 152. Similarly, data packets received at a transceiver 154 may be decoded by the transceiver 154 and provided to the processor 156 coupled therewith. In some embodiments, the processor 156 may utilize instructions stored in memory 158 to facilitate operations of the communication device 160.

The processor 156 may be or include one or more of an Integrated Circuit (IC) chip, a microprocessor, a Central Processing Unit (CPU), a Graphics Processing Unit (GPU), a Data Processing Unit (DPU), a Field Programmable Gate Array (FPGA), an Application Specific Integrated Circuit (ASIC), combinations thereof, and the like.

The memory 158 may include any number of memory devices, any type of memory device, any combination of different types of memory devices, etc. As an example, the memory 158 may include Random Access Memory (RAM), Read Only Memory (ROM), flash memory, Electronically-Erasable Programmable ROM (EEPROM), Dynamic RAM (DRAM), buffer memory, combinations thereof, and the like.

Figure 1B:
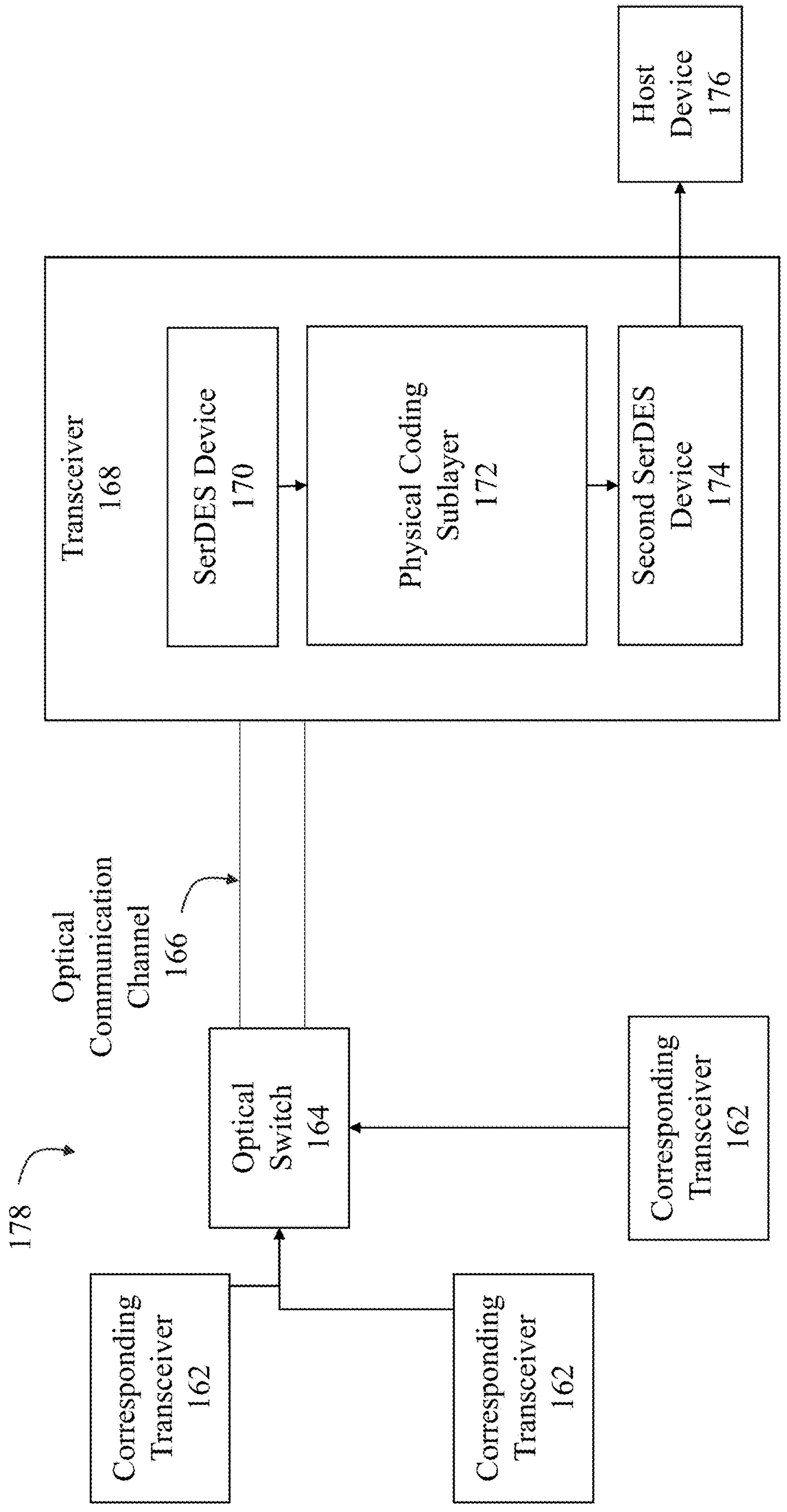
FIG. 1B is a block diagram schematically illustrating a serializer and deserializer device in accordance with some embodiments described herein.

Further, as shown with reference to the system 178 in FIG. 1B, the communication channel may be an optical communication channel 166 or a quantum communication channel referring to an optical line (e.g., fiber, or the like), a quantum line, and/or free space over which quantum information (e.g., photons qubits, single or entangled quantum particles, etc.) is transmitted through particles, such as qubits exchanged using one or more quantum cryptographic techniques (e.g., quantum key distribution) that rely on quantum properties, such as quantum uncertainty, superposition, and/or quantum entanglement. The optical communication channel 166 may include a fiber optic cable or any other optical medium through which optical signals are propagated. The system 178 may further include an optical switch 164 configured to change the pairings between the transceiver 168 and the plurality of corresponding transceivers 162. The transceiver 168 may be an adapter for the optical communication channel 166 and may be configured to convert optical signals received from the optical communication channel 166 into electrical signals for use by a network device. The transceiver 168 may further include a physical coding sublayer (PCS layer) 172 and a serializer/deserializer (SerDES) device 170.

The serializer/deserializer (SerDES) device 170 may be configured to receive a serial bitstream from the optical communication channel 166 and convert the serial bitstream into a de-serialized bitstream, or a parallel bus. The SerDES device 170 may de-serialize a bitstream using a variety of known techniques, such a serial clock recovery technique or a reference clock technique, and may use an embedded clock architecture, parallel clock architecture, bit interleaved architecture, or the like. The SerDES device 170 may be operatively coupled to the transceiver 168 or may be a fully integrated component of the transceiver 168. The SerDES device 170 may be configured to transmit a parallel bus to the PCS layer 172 for data processing. In some embodiments, the system 178 may include a second SerDES device 174, which may be configured to serialize a parallel bus into a serialized bitstream using a variety of known techniques. The second SerDES device 174 may transmit the serialized bitstream to the host device 176.

Datacenters may include multiple network switches in a particular topology, such as a fat tree topology, a slim fly topology, a dragonfly topology, and/or the like. The specifications and makeup of the network switches in the topology affects the overall network performance (e.g., bandwidth capability) of the datacenter.

Datacenters are the storage and data processing hubs of the internet. The massive deployment of cloud applications is causing datacenters to expand exponentially in size, stimulating the development of faster switches than can cope with the increasing data traffic inside the datacenter. Current state-of-the-art switches are capable of handling 12.8 Tb/s of traffic by employing electrical switches in the form of application specific integrated circuits (ASICs) equipped with 256 data lanes, each operating at 50 Gb/s. Such switching ASICs typically consume as much as 400 W, and the power consumption of the optical transceiver interfaces attached to each ASIC is comparable. To keep pace with traffic demand, switch capacity doubles approximately every two years. To date, this rapid scaling has been made possible by exploiting advances in manufacturing (e.g., CMOS techniques), collectively described by Moore's law (i.e., the observation that the number of transistors in a dense integrated circuit doubles about every two years). However, in recent years there are strong indications of Moore's law slowing down, which raises concerns about the capability to sustain the target scaling rate of switch capacity. As a result, alternative technologies are being investigated.

Figure 1C:
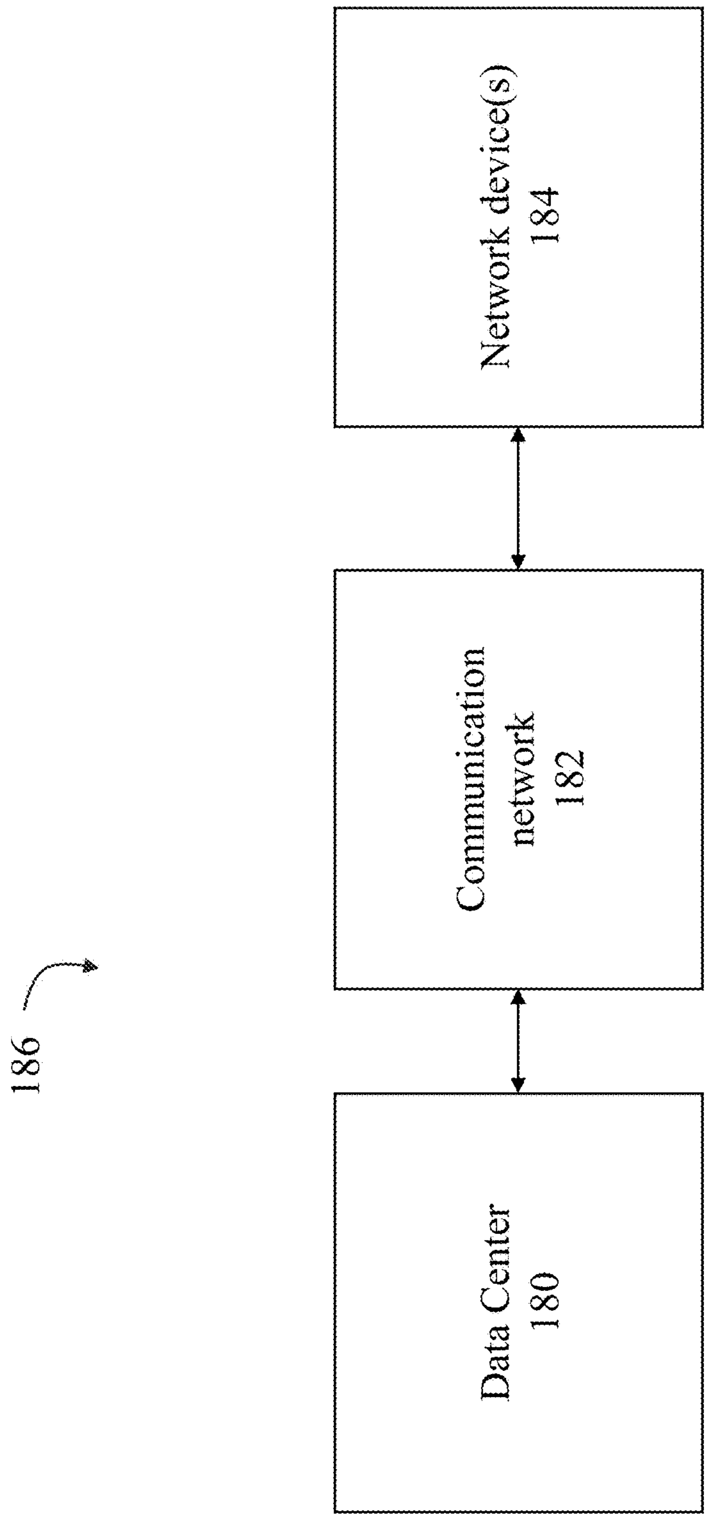
FIG. 1C is a block diagram schematically illustrating a datacenter, a communication network, and a network device in accordance with some embodiments described herein.

FIG. 1C illustrates a system 186 according to at least one example embodiment. The system 186 includes a datacenter 180, a communication network 182, and one or more network devices 184. In at least one example embodiment, the datacenter 180 corresponds to a collection of network devices, such as network switches (e.g., Ethernet switches) connected with a collection of servers or compute nodes. As noted above, the datacenter 180 may adhere to a networking topology (e.g., a hierarchal networking topology), such as a fat tree topology, a Slim Fly topology, a Dragonfly topology, and/or the like. The datacenter 180 routes traffic amongst the network switches and servers therein, and at least one layer of the topology in the datacenter 180 is coupled to the communication network 182 to allow networking traffic to flow between the datacenter 180 and the network device(s) 184.

Examples of the communication network 182 that may be used to connect the datacenter 180 and the network device(s) 184 include an Internet Protocol (IP) network, an Ethernet network, an InfiniBand (TB) network, a Fiber Channel network, the Internet, a cellular communication network, a wireless communication network, combinations thereof (e.g., Fiber Channel over Ethernet), variants thereof, and/or the like.

The one or more network devices 184 may include one or more of a Personal Computer (PC), a laptop, a tablet, a smartphone, a server, a collection of servers, and/or any suitable computing device for sending and receiving signals over the communication network 182. In at least one example embodiment, the one or more network devices 184 correspond to another datacenter, similar to or the same as datacenter 180.

As noted above, the datacenter 180 and/or the network device(s) 184 may include storage devices and/or processing circuitry for carrying out computing tasks, for example, tasks associated with controlling the flow of data internally and/or over the communication network 182. Such processing circuitry may comprise software, hardware, or a combination thereof. For example, the processing circuitry may include a memory including executable instructions and a processor (e.g., a microprocessor) that executes the instructions on the memory. The memory may correspond to any suitable type of memory device or collection of memory devices configured to store instructions. Non-limiting examples of suitable memory devices that may be used include Flash memory, Random Access Memory (RAM), Read Only Memory (ROM), variants thereof, combinations thereof, or the like. In some embodiments, the memory and processor may be integrated into a common device (e.g., a microprocessor may include integrated memory). Additionally or alternatively, the processing circuitry may comprise hardware, such as an application specific integrated circuit (ASIC). Other non-limiting examples of the processing circuitry include an Integrated Circuit (IC) chip, a Central Processing Unit (CPU), a Graphics Processing Unit (GPU), a microprocessor, a Field Programmable Gate Array (FPGA), a collection of logic gates or transistors, resistors, capacitors, inductors, diodes, or the like. Some or all of the processing circuitry may be provided on a Printed Circuit Board (PCB) or collection of PCBs. It should be appreciated that any appropriate type of electrical component or collection of electrical components may be suitable for inclusion in the processing circuitry.

In addition, although not explicitly shown, it should be appreciated that the datacenter 180 and network device(s) 184 may include one or more communication interfaces for facilitating wired and/or wireless communication between one another and other unillustrated elements of the system 186.

Figure 1D:
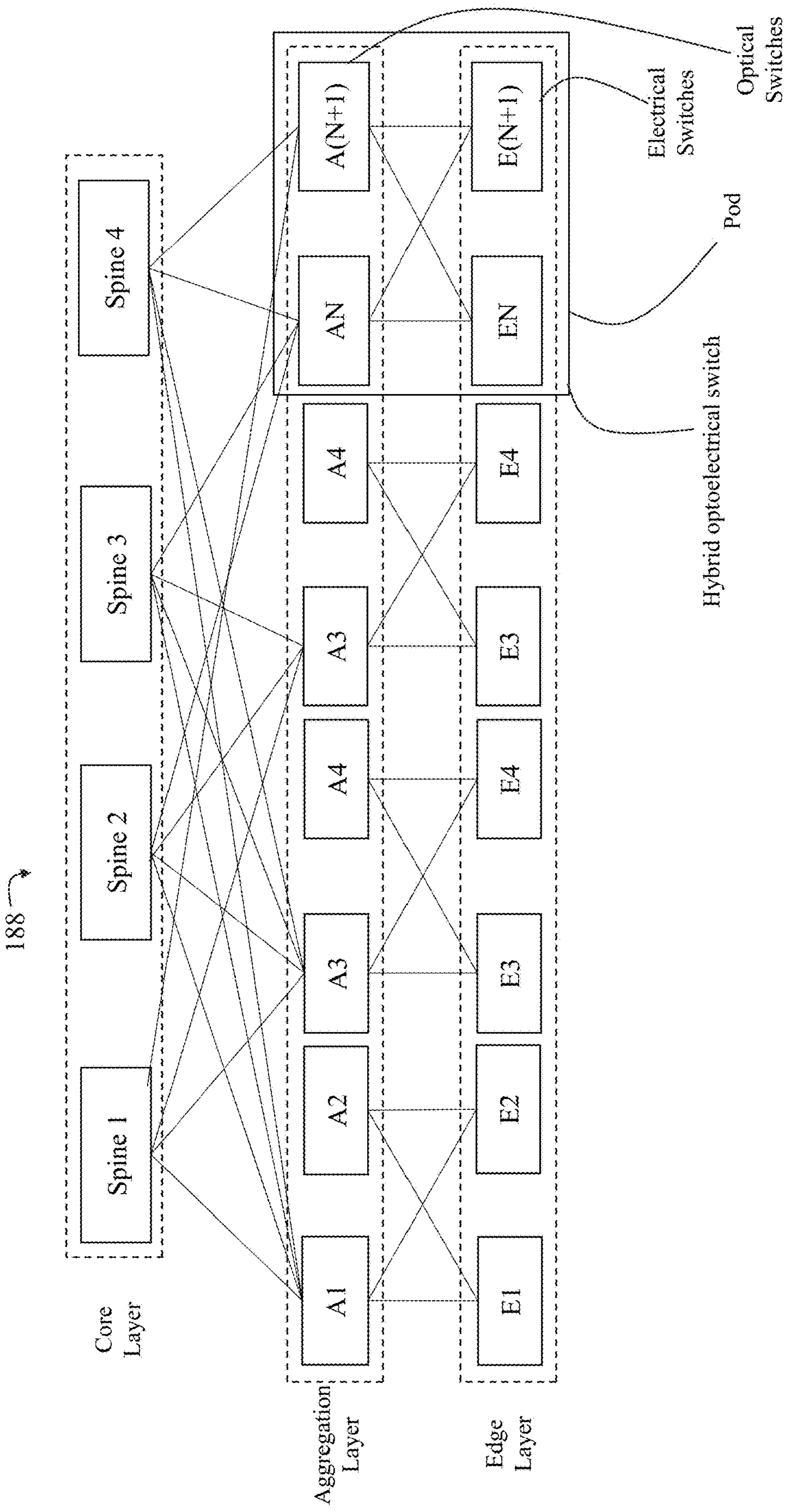
FIG. 1D is a block diagram schematically illustrating an example embodiment of a fat tree topology in accordance with some embodiments described herein.
Figure 1E:
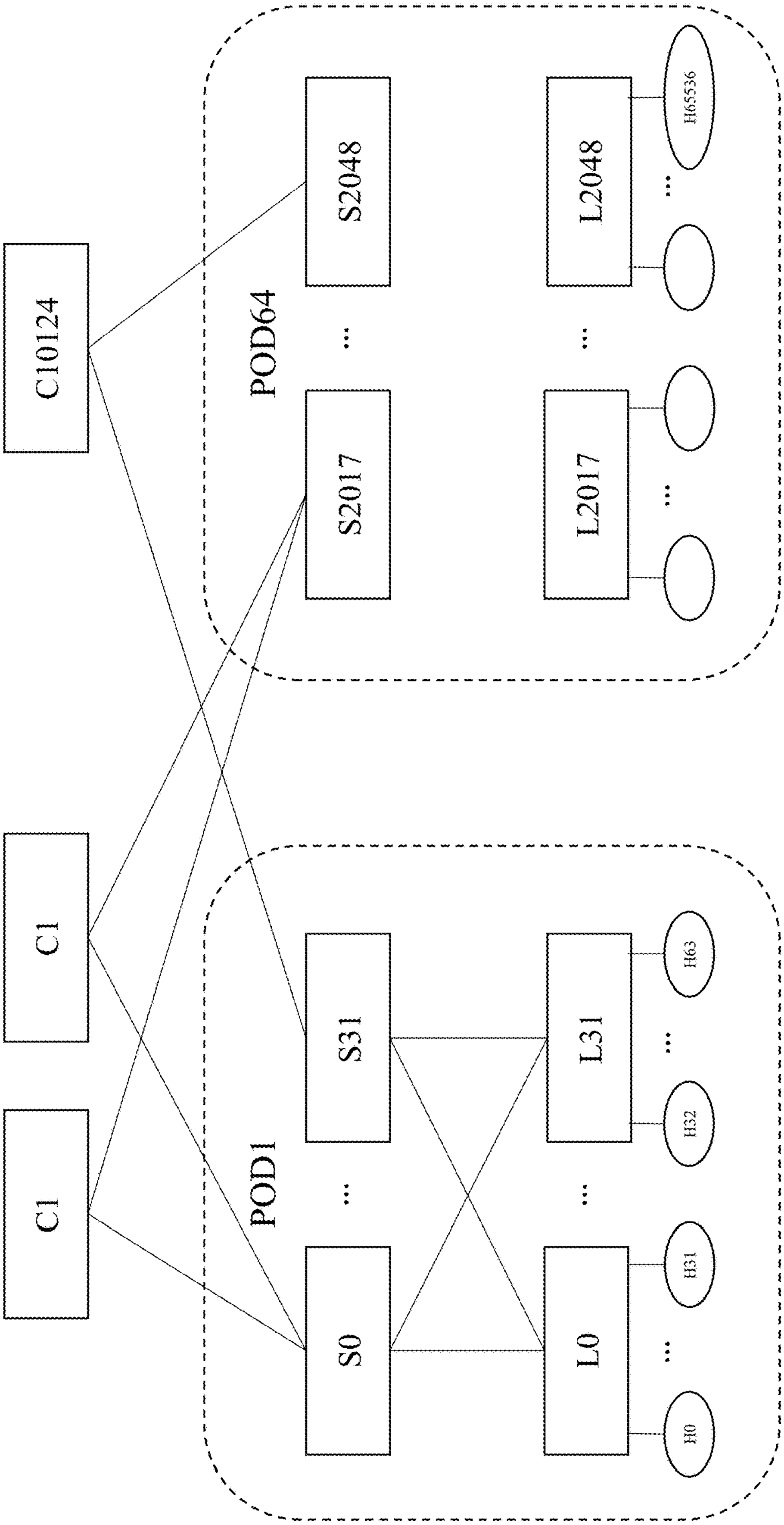
FIG. 1E is a block diagram schematically illustrating a pod configuration in accordance with some embodiments described herein.

With reference to FIGS. 1D and 1E, in related art systems, a fat tree topology may use the same electrical switching devices on all layers (edge, aggregation, core). For example, each switching device may be 1 U switch, where 1 U refers to the industry standard size for rack-mounted switch and/or server. The interconnection between switches of different layers may be accomplished with optical links using active optical cables and optical transceivers implemented in a pluggable form factor (also referred to as “pluggables”).

Optical Data Center Networks rely on allocation and deallocation of light paths from the data sources to the destinations end-ports to guarantee no light collisions and data loss occur in the fabric. Traditionally the allocation algorithms are run from a central entity which considers the entire demand for source and destination flows and try to find the most dense mapping of these demands to network resources over a single or multiple time periods.

Optical switches are one solution for enabling advances in networking due to the technology’s potential for very high data capacity and low power consumption. Optical switches feature optical input and output ports and are capable of routing light that is coupled to the input ports to the intended output ports on demand, according to one or more control signals (electrical or optical control signals). Routing of the signals is performed in the optical domain (i.e., without the need for optical-electrical and electrical-optical conversion), thus bypassing the need for power-consuming transceivers. Header processing and buffering of the data is not possible in the optical domain and, thus, packet switching (as it is realized in electrical switches) cannot be employed. Instead, the circuit switching paradigm is used: an end-to-end circuit is created for the communication between two endpoints connected on the input and the output of the optical switch. Director switches may be used in the most common datacenter interconnection topologies, e.g., fat trees, Slim Fly, and Dragonfly+).

An optical switch may include hardware and/or software for routing signals in the optical domain. Thus, in one embodiment, an optical switch may include input optical fibers and output optical fibers that carry optical signals as well as one or more devices suited for routing optical signals within the optical switch. For example, the one or more devices for routing optical signals may include one or more movable mirrors (e.g., MEMS mirrors) that are controlled to move in a manner that directs light from an input fiber to a desired output fiber or to move in a manner that forces or guides light from one waveguide into another waveguide. An optical switch may include one or more devices for amplifying light in order to compensate for propagation and scattering losses introduced by the optical switch. In at least one example embodiment, signals input and output to an ASIC are optical, meaning that each optical switch connected to an electrical switch routes optical signals received from the electrical switch without using hardware and/or software that converts an electrical signal into an optical signal for routing within the optical switch. However, example embodiments are not limited thereto, and an optical switch may include electrical to optical to electrical conversion hardware and/or software if desired (e.g., if the input signal and/or output signal is an electrical signal).

The optical switch(es) may include an arrayed waveguide grating router (AWGR), which is a passive switch fabric. In some embodiments, the optical switch(es) may correspond to a passive element that operates as a wavelength router that uses multiple wavelengths to interconnect outputs and inputs by following a specific cyclic wavelength routing pattern.

Throughout the instant description, the terms “electrical switch,” “electrical switching ASIC,” “ASIC,” and variants thereof are used interchangeably. Although electrical switches are described herein as electrical blocks as being embodied by ASICs, example embodiments are not limited thereto, and the electrical switches may be implemented with any suitable hardware and/or software that enables routing of signals in the electrical domain.

For example, an electrical switch may include receivers that receive and convert optical signals into electrical signals for routing within the electrical switch. For example, a receiver of an electrical switch may include a transimpedance amplifier (TIA), a photodetector, and a controller which all serve to convert the optical signals into electrical signals. Each electrical switch may further include transmitters that convert electrical signals routed within the electrical switch into optical signals for output to another switch (optical or electrical) within the system. For example, a transmitter of an electrical switch may include a light source, a modulator, and a controller that controls the modulator and light source. In at least one example embodiment, receiver/transmitter pairs are integrated into a single transceiver. Each electrical switch may further include internal switching circuitry for routing electrical signals within the electrical switch.

For example, as mentioned previously, the selectors may interface with optical and traditional electrical networks. Further, the communication lanes may be implemented via optical fibers or traditional electrical cables. For example, the plurality of lanes themselves may be constructed of dedicated differential cable pairs and/or fiber optics. The dedicated differential cable pairs may include a cable medium of copper, aluminum, gold, silver, nickel, and/or composite materials such as copper-clad aluminum, copper-clad steel, bimetallic conductors, or the like. In this way, the cables may provide dedicated physical lanes for each of the communication lanes of a deserialized data stream. For example, each lane in a four-lane network may include its own different copper cable.

Further, the plurality of lanes may be provided by a fiber optic cable. The fiber optic cable may be configured to transmit the data streams via different wavelengths of light, with each data stream receiving its own unique wavelength assignment. In this way, the data streams may be transmitted through a fiber optic cable, but each stream may have a different transmission wavelength.

Various optical networking technologies can be used for transmitting multiple optical signals (e.g., data signals or data streams) over a single optical fiber within an optical link with little to no optical signal interference. Such optical networking technologies can increase the amount of data that can be transmitted via a single optical fiber, which can increase bandwidth efficiency and reduce the amount of infrastructure (e.g., hardware) needed for data communication.

A serializer-deserializer (SerDES) is pair of functional components used in high-speed communications networking to convert data between serial and parallel interfaces. At the transmission endpoint, the deserializer converts a serial data stream into parallel data streams by distributing the serial data stream into multiple parallel lanes (i.e. lanes being served by different fibers). The parallel (e.g., deserialized) data may be assigned communication lanes within a networking system, which may typically include a two-lane, four-lane, or eight-lane pipeline. For example, if a 64-byte stream is being distributed across a four-lane communication channel network, lane 0 may haul the most significant 16 bytes, lane 1 may haul the next most significant 16 bytes, lane 2 may haul the third most significant 16 bytes, and lane 3 may haul the least significant 16 bytes. Deserialization of data allows for efficient data handling in high-speed communication systems, especially where large volumes of data need to be processed quickly. Further, the deserialized data may interface and integrate with different types of devices and technologies associated with the communications network. At the destination endpoint, the serializer converts the parallel data from the multiple lanes back into a serial data stream on a single line.

Further, the plurality of lanes may be provided by a fiber optic cable. The fiber optic cable may be configured to transmit the data streams via different wavelengths of light, with each data stream receiving its own unique wavelength assignment. In this way, the data streams may be transmitted through a fiber optic cable, but each stream may have a different transmission wavelength.

Figure 1F:
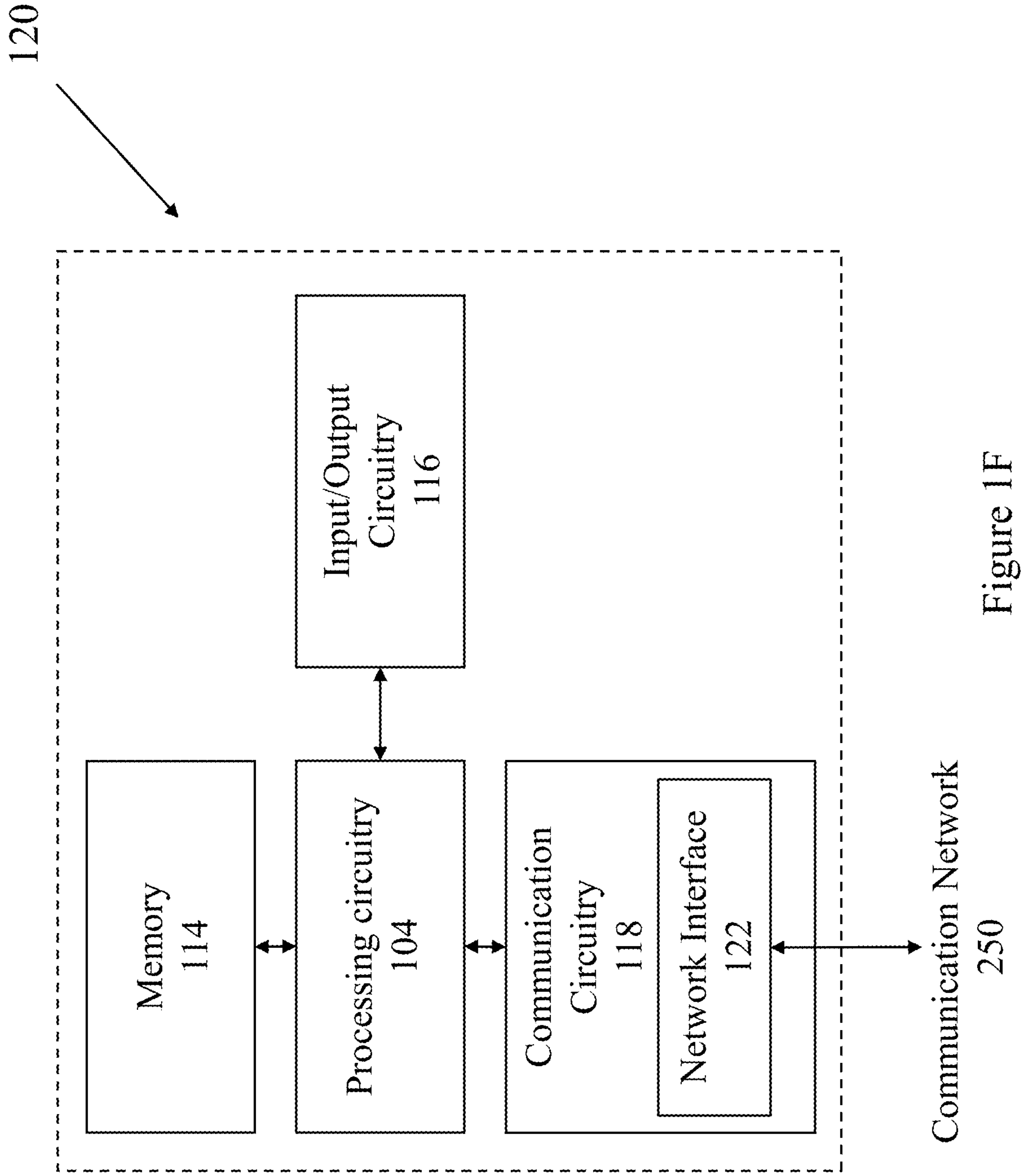
FIG. 1F is a block diagram schematically illustrating circuitry for scrambling communication channels in accordance with some embodiments described herein.

FIG. 1F is a schematic illustration of example circuitry for scrambling communication channels. For ease of explanation, FIG. 1F shows the circuitry as being embodied by a network device 120; however, with reference to FIG. 2, some or all of the circuitry may be included in a device such as a permutation shift orchestrator 202 (PSO), a first selector 208, a second selector 208, a transmitter 204, and/or a receiver 214 and/or may be embodied by a separate device in communication with the network device 120, the permutation shift orchestrator 202, the first selector 208, the second selector 208, the transmitter 204, and/or the receiver 214, such as in a case where no network device 120 is provided. As shown in FIG. 1F, the circuitry may include a processing circuitry 104, a memory 114, input/output circuitry 116, and communication circuitry 118. The lane permutation switch in the Network Lane Scrambled Domain is orchestrated by infrastructure control software that is securely connected to the optical switch control planes of the network. Before moving on with the switch, the orchestrator quiesces SerDES links of the relevant endpoints kicking them into clock-compensation/link training mode as they will be briefly disconnected (e.g., disconnected for a few nanoseconds for fast switches). Then it proceeds to configure the "mirrored" permutations in the optical switches. SerDES links will come up automatically upon reconfiguration.

Although the term "circuitry" as used herein with respect to components 104, 114-120 is described in some cases using functional language, it should be understood that the particular implementations necessarily include the use of particular hardware configured to perform the functions associated with the respective circuitry as described herein. It should also be understood that certain of these components 104, 114-120 may include similar or common hardware. For example, two sets of circuitries may both leverage use of the same processor, network interface, storage medium, or the like to perform their associated functions, such that duplicate hardware is not required for each set of circuitries. It will be understood in this regard that some of the components described in connection with the circuitry shown in FIG. 1F may be housed together, while other components are housed separately. While the term "circuitry" should be understood broadly to include hardware, in some embodiments, the term "circuitry" may also include software for configuring the hardware. For example, in some embodiments, "circuitry" may include processing circuitry, storage media, network interfaces, input/output devices, and the like. In some embodiments, other elements of the circuitry may provide or supplement the functionality of particular circuitry. For example, the processing circuitry 104 may provide processing functionality, the memory 114 may provide storage functionality, the input/output circuitry 116 may provide external interface functionality, the communication circuitry 118 may provide network interface functionality, and the like.

In some embodiments, the processing circuitry 104 (and/or co-processor or any other processing circuitry assisting or otherwise associated with the processor) may be in communication with the memory 114 via a bus for passing information among components of the circuitry. The memory 114 may be non-transitory and may include, for example, one or more volatile and/or non-volatile memories, or some combination thereof. In other words, for example, the memory 114 may be an electronic storage device (e.g., a non-transitory computer readable storage medium). The memory 114 may be configured to store information, data, content, applications, instructions, or the like, for enabling an apparatus, e.g., the permutation shift orchestrator 202, the first selector 208, or the second selector 212 of FIG. 2, to carry out various functions in accordance with example embodiments of the present disclosure. The memory 114 may further be configured to provide functionality for handling incoming data streams, lane assignments, and the like.

Figure 2:
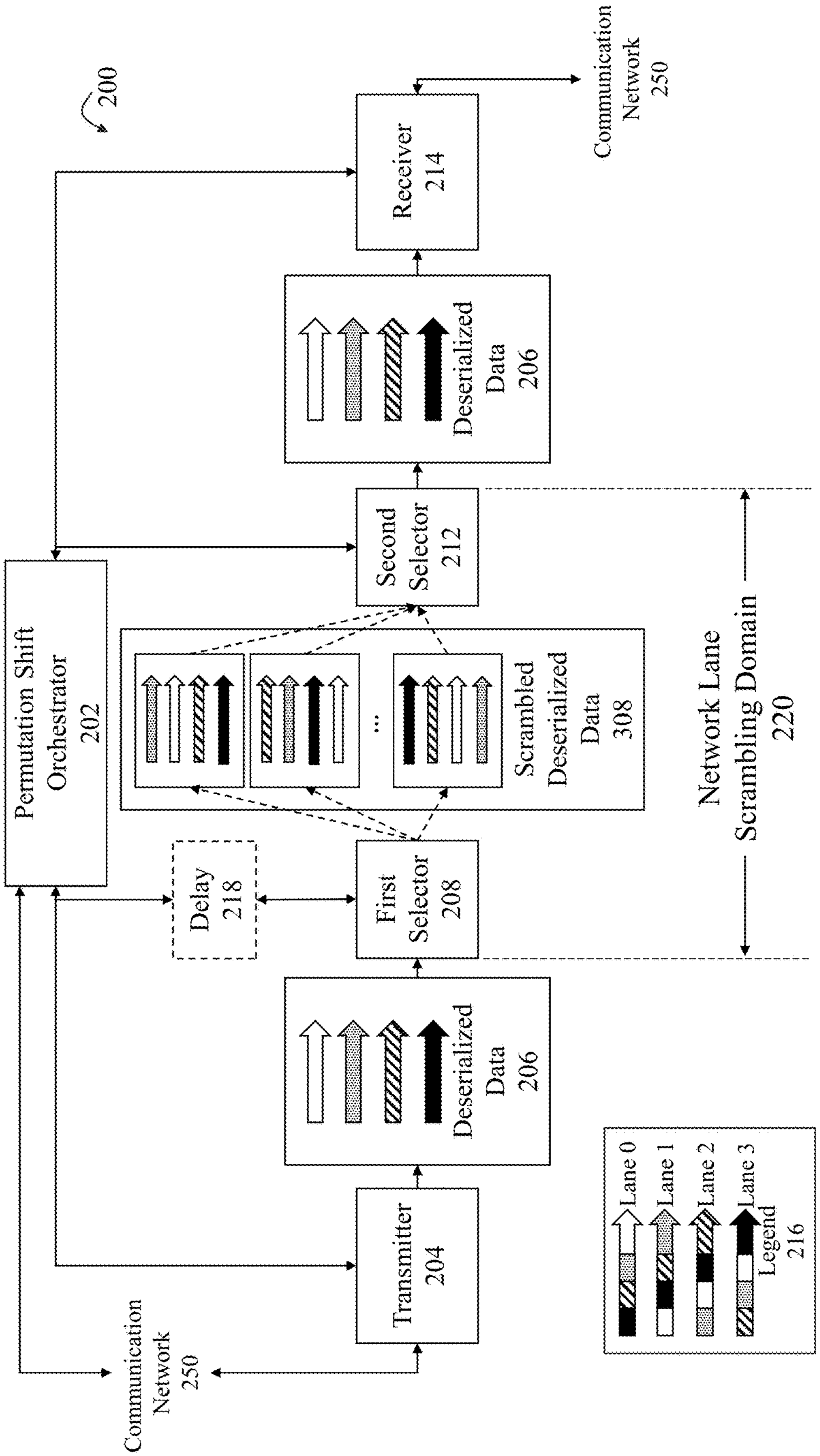
FIG. 2 is a schematic illustration of a location of a network lane scrambling domain in accordance with some embodiments described herein.

For example, as shown in FIG. 2, the permutation shift orchestrator 202 (PSO) may transmit pre-computed lane permutations (e.g., data stream lane assignments) to the first selector 208, which may be stored in the memory 114 of the first selector 208. Similarly, the second selector 212 may also store the pre-computed lane permutations in its memory 114. In this way, the selectors (e.g., the first selector 208 and the second selector 212) may be a network device 120 as shown in FIG. 1F, may have components similar to a network device 120 (e.g., a processing circuitry 104, a memory 114, input/output circuitry 116, communication circuitry 118, and the like), or be in communication with a network device 120 and its associated components. Further, in some embodiments, the selectors (e.g., the first selector 208 and the second selector 212) may each have their own memory 114, wherein the selectors are able to store the pre-computed lane permutations independently. These pre-computed lane permutations may be accessed at a later point in time to determine the lane assignments of an incoming data stream (e.g., deserialized data 206). Permutation patterns can be generated at the endpoints based on an agreed algorithm and do not have to travel on the network, which provides protection from the adversarial control plane attacks.

Additionally, or alternatively, in some embodiments, the processing circuitry 104 may use the memory 114 to store or access previously collected information. For example, in some implementations, the processing circuitry 104 may include hardware, software, firmware, and/or a combination thereof, that interacts with the memory 114 to send, retrieve, update, and/or store data. For example, lane permutations (e.g., the lane permutations 210) may be stored on the memory 114 and accessed by the processing circuitry 104 when appropriate.

Although illustrated in FIG. 1F as a single memory, the memory 114 may comprise a plurality of memory components. The plurality of memory components may be embodied on a single computing device or distributed across a plurality of computing devices. In various embodiments, the memory 114 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. The memory 114 may be configured to store information, data, applications, instructions, or the like for enabling the device (e.g., the permutation shift orchestrator 202 in FIG. 2, etc.) to carry out various functions in accordance with example embodiments discussed herein. For example, in at least some embodiments, the memory 114 may be configured to buffer data for processing by the processing circuitry 104. Additionally, or alternatively, in at least some embodiments, the memory 114 may be configured to store program instructions for execution by the processing circuitry 104. The memory 114 may store information in the form of static and/or dynamic information. This stored information may be stored and/or used by the processing circuitry 104 or other components during the course of performing its functionalities.

The processing circuitry 104 may be embodied in a number of different ways and may, for example, include one or more processing devices configured to perform independently. Additionally, or alternatively, the processing circuitry 104 may include one or more processors configured in tandem via a bus to enable independent execution of instructions, pipelining, and/or multithreading. The processing circuitry 104 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. The use of the term "processing circuitry" may be understood to include a single core processor, a multi-core processor, multiple processors internal to the apparatus, and/or remote or "cloud" processors. Accordingly, although illustrated in FIG. 1F as a single processor, in some embodiments, the processing circuitry 104 may include a plurality of processors. The plurality of processors may be embodied on a single computing device (e.g., the network device 120 as shown in FIG. 1F, the permutation shift orchestrator 202 in FIG. 2, the first selector 208, and/or the second selector 212) or may be distributed across a plurality of such devices collectively. The plurality of processors may be in operative communication with each other and may be collectively configured to perform one or more functionalities of the circuitry (e.g., the network device 120 as shown in FIG. 1F, the permutation shift orchestrator 202 in FIG. 2, the first selector 208, and/or the second selector 212) as described herein.

In an example embodiment, the processing circuitry 104 may be configured to execute instructions stored in the memory 114 or otherwise accessible to the processing circuitry 104. Alternatively, or additionally, the processing circuitry 104 may be configured to execute hard-coded functionality. As such, whether configured by hardware or software methods, or by a combination thereof, the processing circuitry 104 may represent an entity (e.g., physically embodied in circuitry) capable of performing operations according to an embodiment of the present disclosure while configured accordingly. Alternatively, as another example, when the processing circuitry 104 is embodied as an executor of software instructions, the instructions may specifically configure the processing circuitry 104 to perform one or more algorithms and/or operations described herein when the instructions are executed. For example, these instructions, when executed by the processing circuitry 104, may cause the associated device (e.g., the network device 120 as shown in FIG. 1F, the permutation shift orchestrator 202 in FIG. 2, the first selector 208, and/or the second selector 212) to perform one or more of the functionalities thereof as described herein. In other embodiments, the communication circuitry 118 is configured to, via the processing circuitry 104, communicate with a first selector and a second selector to configure the first and second selectors according to embodiments of the disclosure as described herein.

In some embodiments, the circuitry further includes input/output circuitry 116 that may, in turn, be in communication with the processing circuitry 104 to provide an audible, visual, mechanical, or other output and/or, in some embodiments, to receive an indication of an input from a user or another source. In that sense, the input/output circuitry 116 may include means for performing analog-to-digital and/or digital-to-analog data conversions. The input/output circuitry 116 may include support, for example, for a display, touchscreen, keyboard, mouse, image capturing device (e.g., a camera), microphone, and/or other input/output mechanisms. The input/output circuitry 116 may include a user interface and may include a web user interface, a mobile application, a kiosk, or the like.

The processing circuitry 104 and/or user interface circuitry comprising the processing circuitry 104 may be configured to control one or more functions of a display or one or more user interface elements through computer-program instructions (e.g., software and/or firmware) stored on a memory accessible to the processing circuitry 104 (e.g., the memory 114, and/or the like). In some embodiments, aspects of input/output circuitry 116 may be reduced as compared to embodiments where the circuitry may be implemented as an end-user machine or other type of device designed for complex user interactions. In some embodiments (like other components discussed herein), the input/output circuitry 116 may be eliminated from the associated device circuitry (e.g., the network device 120 as shown in FIG. 1F, the permutation shift orchestrator 202 in FIG. 2, the first selector 208, and/or the second selector 212). The input/output circuitry 116 may be in communication with memory 114, communications circuitry 118, and/or any other component(s), such as via a bus. Although more than one input/output circuitry and/or other component can be included, only one is shown in FIG. 1F to avoid overcomplicating the disclosure (e.g., as with the other components discussed herein).

The communications circuitry 118, in some embodiments, includes any means, such as a device or circuitry embodied in either hardware, software, firmware or a combination of hardware, software, and/or firmware, that is configured to receive and/or transmit data from/to a network and/or any other device, circuitry, or module associated therewith. In this regard, the communications circuitry 118 may include, for example, a network interface 122 for enabling communications with a wired or wireless communication network (e.g., the communication network 250 as shown in FIGS. 1F and 2). For example, in some embodiments, communications circuitry 118 may be configured to receive and/or transmit any data that may be stored by the memory 114 using any protocol that may be used for communications between computing devices. For example, the communications circuitry 118 may include one or more network interface 122 components, such as cards, antennae, transmitters, receivers, buses, switches, and even peripherals that communicate within the server boundaries (e.g., Peripheral Component Interconnect Express (PCIe)), routers, modems, and supporting hardware and/or software, and/or firmware/software, or any other device suitable for enabling communications via a network. Additionally, or alternatively, in some embodiments, the communications circuitry 118 may include circuitry for interacting with the antenna(s) to cause transmission of signals via the antenna(e) or to handle receipt of signals received via the antenna(e). These signals may be transmitted by the network device 120 using any of a number of wireless personal area network (PAN) technologies, such as Bluetooth® v1.0 through v5.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols. The communications circuitry 118 may additionally or alternatively be in communication with the memory 114, the input/output circuitry 116, and/or any other component shown FIG. 1F, such as via a bus. The communication circuitry 118 may also be configured to receive and transmit information with the various components associated therewith. Further, the communication circuitry 118 may communicate with other devices having memory that holds information needed for processing data packets.

Accordingly, non-transitory computer readable storage media can be configured to store firmware, one or more application programs, and/or other software, which include instructions and/or other computer-readable program code portions that can be executed to direct operation of the associated device circuitry (e.g., the network device 120 as shown in FIG. 1F, the permutation shift orchestrator 202 in FIG. 2, the first selector 208, and/or the second selector 212) to implement various operations, including the examples described herein. As such, a series of computer-readable program code portions may be embodied in one or more computer-program products and can be used, with a device (e.g., the network device 120 as shown in FIG. 1F, the permutation shift orchestrator 202 in FIG. 2, the first selector 208, and/or the second selector 212), database, and/or other programmable apparatus, to produce the machine-implemented processes discussed herein. Further, the disclosure as provided herein may be performed by a system, such as a networking system 200 shown in FIG. 2. It is also noted that all or some of the information discussed herein can be based on data that is received, generated and/or maintained by one or more components of the associated device circuitry (e.g., the network device 120 as shown in FIG. 1F, the permutation shift orchestrator 202 in FIG. 2, the first selector 208, and/or the second selector 212). In some embodiments, one or more external systems (such as a remote cloud computing and/or data storage system) may also be leveraged to provide at least some of the functionality discussed herein.

The present disclosure may be applicable to optical networks and traditional electrical networks (e.g., ethernet) alike. Further, the present disclosure may be applicable to networking systems (e.g., the networking system 200 as shown in FIG. 2). In some embodiments, and as shown in FIG. 2, a transmitter 204 may receive serialized data (not shown) and convert it to deserialized data 206. The serialized data may be received by the transmitter 204 in a single line (e.g., a single fiber or cable), and the transmitter 204 may deserialize the data into a number of lanes corresponding to the number of communication lanes of the infrastructure. In some embodiments, and as shown in FIG. 2, the deserialized data 206 may be distributed across four lanes (e.g., lane 0, lane 1, lane 2, and lane 3 as shown in legend 216). In some embodiments, however, the transmitter 204 may distribute the data across any number of lanes, including two, three, five, six, seven, eight, nine, ten, eleven, twelve, thirteen, fourteen, fifteen, sixteen, seventeen, eighteen, nineteen, twenty, and so on. In some embodiments, the data may be distributed among the communication channels (e.g., lanes) based on the significance of the data. In this way, the most significant data may be assigned to the first lane, the second most significant data may be assigned to the second lane, the third most significant data may be assigned to the third lane, the fourth most significant data may be assigned to the fourth lane, and so on. In some embodiments, the transmitter 204, the permutation shift orchestrator 202, an additional device, or the like, may determine the significance of the data and make the lane assignment of the data streams accordingly.

The transmitter 204 may transmit the data to the first selector 208 by way of circuitry (e.g., input/output circuitry 116 or communication circuitry 118 as shown in FIG. 1), wired connections, fiber connections, wireless connections or the like. The selectors (e.g., the first selector 208 and the second selector 212) may configure the data depending on the lane construction of the communication channels. In this way, if the lanes are constructed using dedicated cables, the selectors may include switches that switch the lanes through which the data may flow. Further, if the lanes are constructed using fiber optics, the selectors may configure the wavelengths of the data to create distinct wavelength communication lanes for each data stream. The selector, therefore, may be able to carry out reconfigurations of the lane assignments during runtime (either at the wavelength level within a single fiber or at the physical link level across multiple fibers).

In some embodiments, once the data (e.g., deserialized data 206) is transmitted to the first selector 208, it may be considered to have entered a network lane scrambling domain 220. In some embodiments, the network lane scrambling domain 220 may indicate a section of the network where the lane scrambling operation takes place and may be defined with its endpoints being selectors. For example, as shown in FIG. 2, the network lane scrambling domain 220 may be bounded by the first selector 208 at one end and the second selector 212 at the other end. In this way, the present disclosure may be applied at scale to full network deployments, rather than being limited to a transmitter-to-receiver basis.

Figure 5:
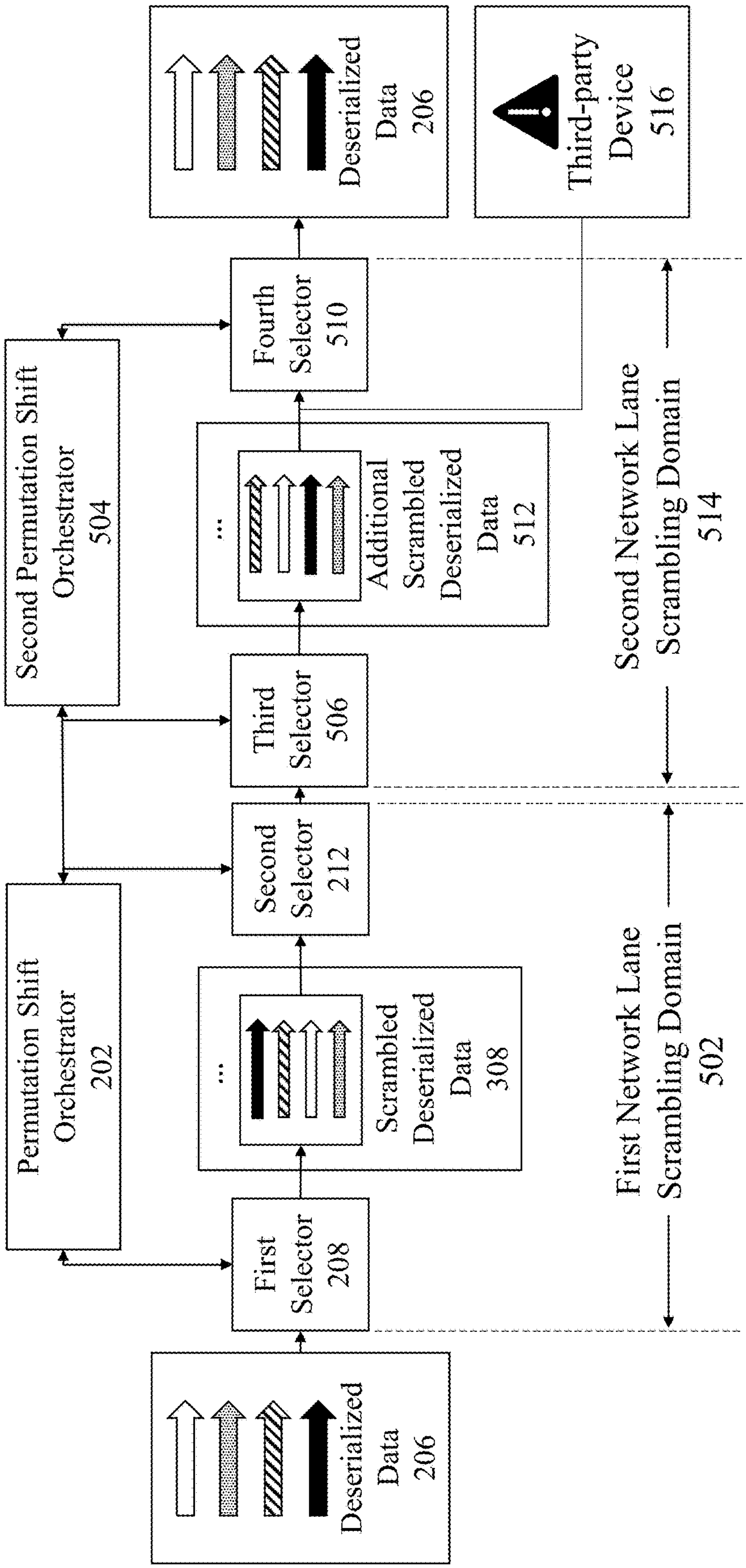
FIG. 5 is a schematic illustration of multiple network lane scrambling domains in accordance with some embodiments described herein.

A network (e.g., the networking system 200 of FIG. 2 or a similar network) may have any number of network lane scrambling domains, including one, two, three, four, five, six, seven, eight, nine, ten, twenty, thirty, forty, fifty, or the like. In some embodiments, the number of lane scrambling domains may be proportionate to the amount of infrastructure that needs to be protected. For example, if there are two datacenters that need to be protected but are physically separated (e.g., by a wall, different buildings, different floors in a building, over a distance, or the like), then two network lane scrambling domains may be implemented. The multiple network lane scrambling domains may be operatively coupled to one another via the selectors. For example, as shown in FIG. 5, a first network lane scrambling domain 502 may be operatively coupled to a second network lane scrambling domain 514 via their own respective selectors (e.g., the second selector 212 and the third selector 506). In some embodiments, the multiple network lane scrambling domains may be operatively coupled via a shared selector. For example, the first network lane scrambling domain 502 and second network lane scrambling domain 514 may share the second selector 212 rather than the second network lane scrambling domain 514 having the third selector 506.

Further, in embodiments where multiple network lane scrambling domains are implemented as shown in FIG. 5, the first network lane scrambling domain 502 and the second network lane scrambling domain 514 may have independent permutation shift orchestrators (e.g., the permutation shift orchestrator 202 and the second permutation shift orchestrator 504). In some embodiments, the multiple network lane scrambling domains may share a single permutation shift orchestrator rather than having their own independent ones.

As shown in FIG. 2, once the deserialized data 206 enters the network lane scrambling domain 220, it may be scrambled by the first selector 208. The permutation shift orchestrator 202 may configure the first selector 208 according to a first configuration, wherein the transmitter 204 is configured to transmit the deserialized data 206 to the first selector 208 for transmission as a set of data streams to the second selector 212, and wherein the first configuration defines an assignment of each data stream of the set of data streams to a corresponding lane of a plurality of lanes for transmission. In some embodiments, the plurality of lanes may be provided via differential cable pairs. In other embodiments, the plurality of lanes may be provided via a fiber optic cable. In some embodiments, the first configuration of the first selector 208 may cause the deserialized data 206 to become the scrambled deserialized data 308. Further, in some embodiments, the permutation shift orchestrator 202 may configure the second selector 212 according to the first configuration, wherein the set of data streams transmitted via the plurality of lanes according to the first configuration of the first selector is re-ordered via the second selector 212 configured according to the first configuration to form the deserialized data 206 for serialization by the receiver 214. The permutations are agreed by the endpoints so the described lane scrambling caused at the transmitter (Tx) side optical circuit switch (OCS) is remedied by the OCS before the receiver (Rx) side, such that the Rx side keeps receiving lane data in the right order to assemble the dataflit correctly. For example, and as shown in FIG. 2, the scrambled deserialize data 308 may include the set of data streams transmitted via the plurality of lanes according to the first configuration.

Figure 3:
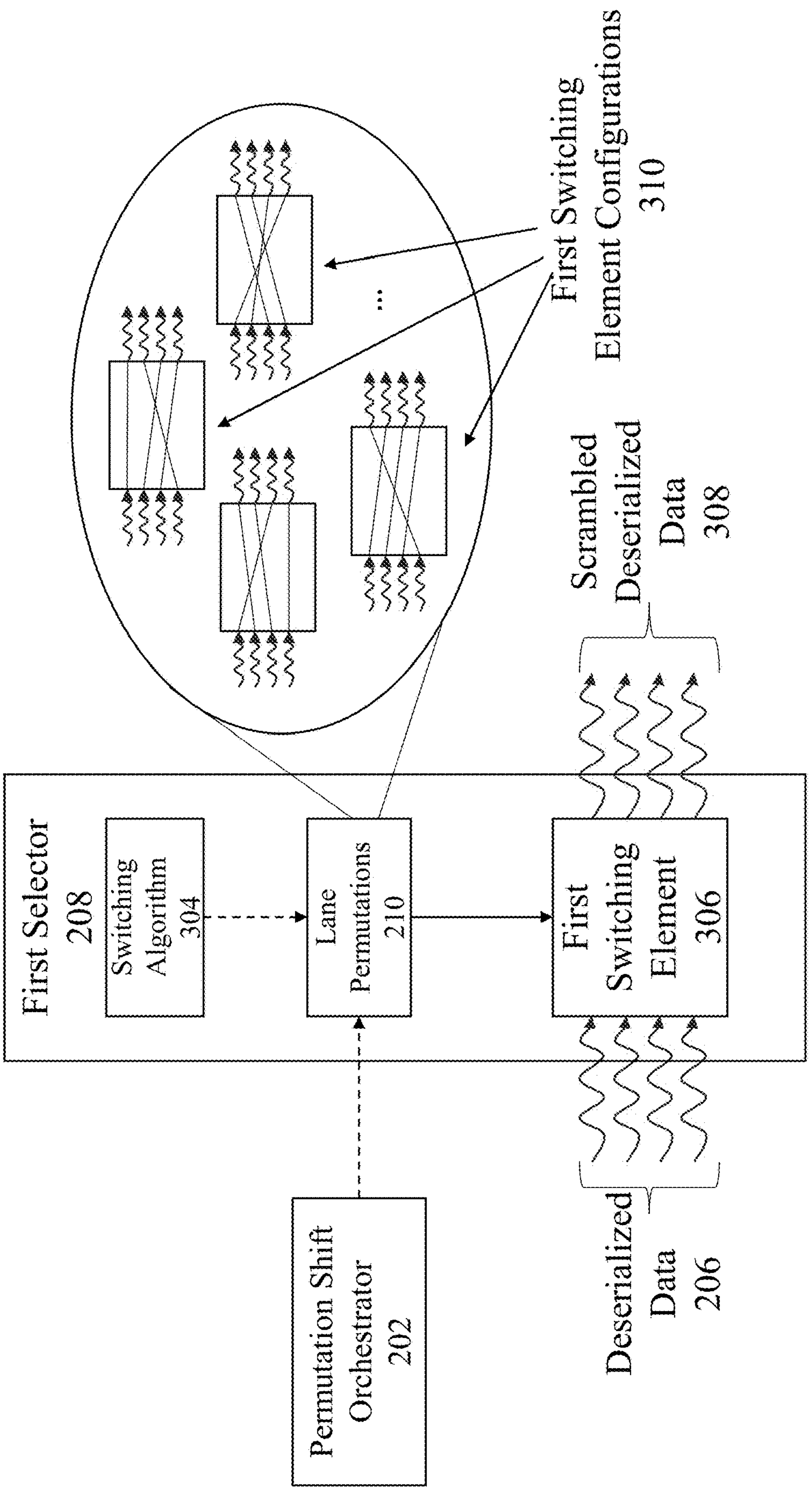
FIG. 3 is a schematic illustration of an example detail view of a first selector in accordance with some embodiments described herein.

In some embodiments, the first selector 208 may include a first switching element 306, as shown in FIG. 3. The first switching element 306 may include components necessary to scramble the deserialized data 206 in accordance with the pre-computed lane permutation configurations (e.g., lane permutations 210) received from the permutation shift orchestrator 202. The first switching element 306, as shown in FIG. 3, may then scramble the deserialized data 206 according to a selection of lane permutations 210 to create the scrambled deserialized data 308. The first selector 208, by way of a selection of one of the pre-computed lane permutations 210, may reconfigure the deserialized data's 206 order and randomly assign it new lane assignments to create the scrambled deserialized data 308. The lane permutations 210 may configure the first switching element 306 based on a variety of first switching element configurations 310. In this way, the first switching element 306 may be configured to take each of the incoming deserialized data 206 lane assignments and distribute (e.g., scramble) them into new, outgoing lane assignments to create the scrambled deserialized data 308.

In some embodiments, the permutation shift orchestrator 202 may transmit the plurality of lane permutations to the first selector 208, wherein the first selector 208 is configured to store the plurality of pre-computed lane permutations. The plurality of lane permutations may include the pre-computed lane permutations (e.g., the lane permutations 210), wherein at least one of the lane permutations 210 may be used as the first configuration. Further, the first selector 208 may store the lane permutations 210 in its memory (e.g., similar to the memory 114 in FIG. 1). In some embodiments, the permutation shift orchestrator 202 may transmit the lane permutations 210 to the first selector 208 using a slow signal and in the form of register values.

Further, in some embodiments, the permutation shift orchestrator 202 may transmit a selector signal to the first selector 208, wherein the selector signal indicates a pre-computed lane permutation from the plurality of pre-computed lane permutations for use as the first configuration. In this way, the selector signal may select a lane permutation from the lane permutations 210 to be used to scramble the deserialized data 206. Further, the selector signal may be transmitted to the first selector 208 using a first signal type, which may include a fast interface or fast signal. In some embodiments, the first signal type (e.g., the fast interface) may include a General Purpose Input/Output (GPIO) signal to indicate which lane permutation of the lane permutations 210 should be used as the first configuration. In some embodiments, the plurality of pre-computed lane permutations is transmitted via a first signal type (e.g., the fast signal) and the selector signal is transmitted via a second signal type (e.g., a slow signal). Additionally, or alternatively, the lane permutations 210 may be selected by the GPIO signal in a round-robin manner that functionally imposes a different lane permutation by activating different register values associated with the lane permutations 210. In some embodiments, the permutation shift orchestrator 202 may continually update the register values (associated with the lane permutations 210) via the slow interface and select the permutations via the fast interface.

In some embodiments, the first selector 208 and the second selector 212 may include a switching algorithm, wherein the switching algorithm configures the first selector 208 and the second selector 212 according to the first configuration, and wherein the switching algorithm is stored in the first selector 208 and in the second selector 212. For example, and as shown in FIG. 3, the lane permutations 210 used by the first selector 208 may be selected by a switching algorithm 304. In this way, the first selector 208 may configure the lane assignment of the scrambled deserialized data 308 according to the lane permutation chosen by the switching algorithm 304. The switching algorithm 304 may be an agreed upon algorithm implemented in each of the selectors (e.g., the first selector 208 and the second selector 212). In some embodiments, the algorithm may eliminate the need to communicate the lane permutations 210 across the network, increasing security of the network. For instance, the switching algorithm 304 in the first selector 208 may configure the first selector 208 to create the scrambled deserialized data 308, while the switching algorithm 304 in the second selector 212 may configure the second selector 212 to create the deserialized data 206.

Further, the algorithm 304 may be stored separately on each selector (e.g., the first selector 208 and the second selector 212) and change periodically. The periodic changing of the algorithm 304 may be based on a synchronized clock schedule, volume of data served, or the like. In addition, the selectors may offer an externally controlled probe which may be used as a stimulation input that enables the selectors to rotate across a number of predefined permutations. These predefined permutations may have been securely programmed prior to deployment in the selectors. Further, the coordinated rotation of the predefined (e.g., pre-programmed) permutations across the selectors may be managed by a centralized entity that only requires secure attestation for the described probe control. In some embodiments, the centralized entity may include the permutation shift orchestrator 202. In this way, the permutation shift orchestrator 202 may manage the rotation of the predefined permutations across the selectors.

Figure 4:
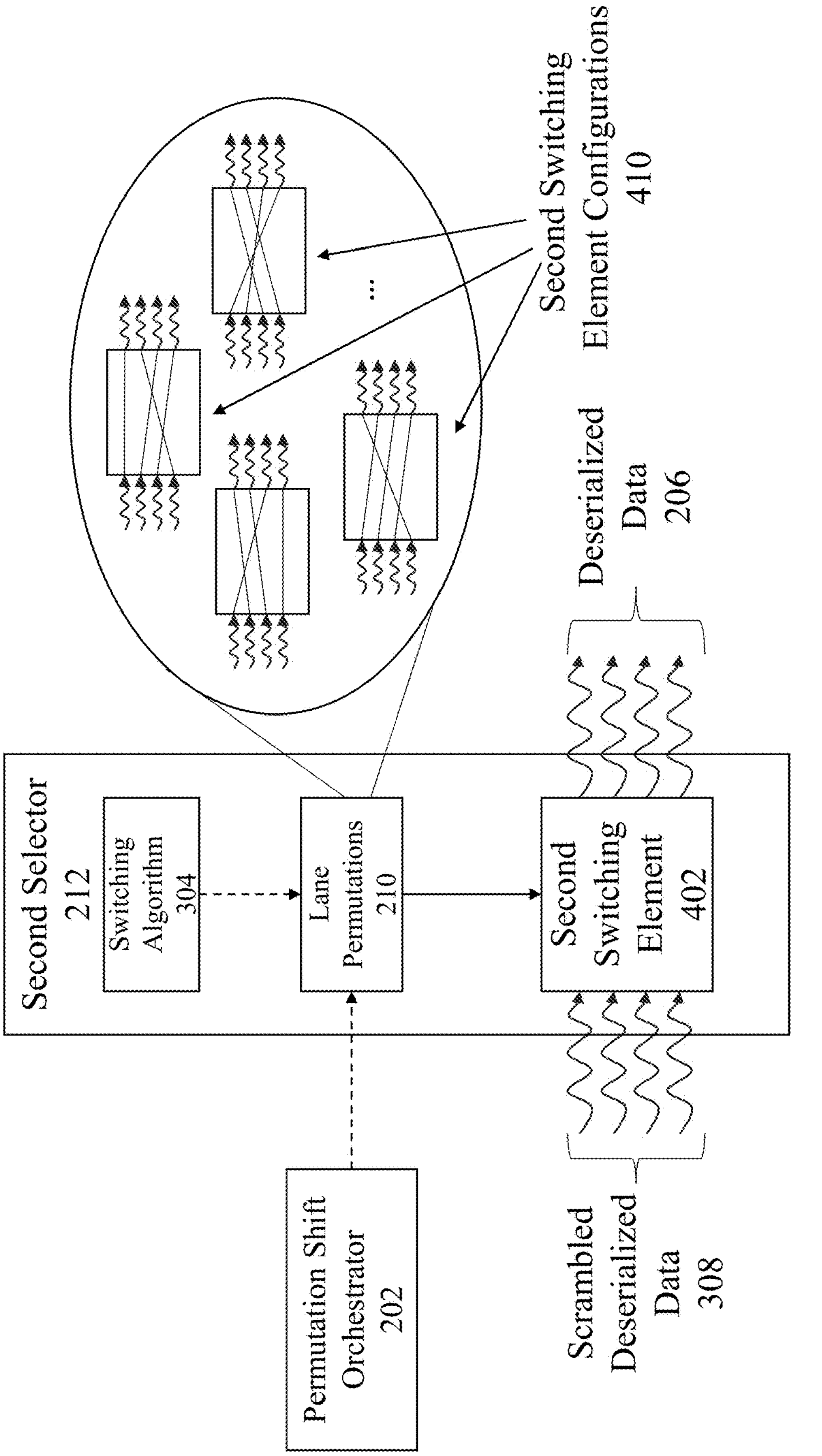
FIG. 4 is a schematic illustration of an example detail view of a second selector in accordance with some embodiments described herein.

For example, as shown in FIG. 3, the permutation shift orchestrator 202 may select a lane permutation from the first switching element configurations 310 to be used by the first selector 208. The first switching element configurations 310 may be predefined permutations that have been securely programmed prior to being deployed (e.g., stored on the first selector 308). Further, as shown in FIG. 4, the permutation shift orchestrator 202 may also choose a complimentary lane permutation from the second switching element configurations 410 to be used by the second selector 212. The complimentary nature of the lane permutation may take the scrambled deserialized data 308 and re-order it to the deserialized data 206. Similar to the first switching element configurations 310, the second switching element configurations 410 may have been securely programmed prior to deployment and/or storage in the second selector 212.

In some embodiments, the externally controlled probe may be included in the permutation shift orchestrator 202 or may be a standalone component dedicated to cause the rotation of the predefined permutations. In some embodiments, and as mentioned above, the stimulation input used to select the predefined permutations may include a fast GPIO interface. Further, in some embodiments, transmitting the predefined permutations to the selectors may be carried out by a slow interface. Further still, and in some embodiments, the coordinated rotation of the predefined permutations may be performed in any number of ways, such as a round-robin manner. In some embodiments, the coordinated rotation may be based on other scheduling manners such as first-in-first-out, priority scheduling, random rotation, weighted round robin, and the like.

As shown in FIG. 2, and in some embodiments, the second selector 212 may receive the scrambled deserialized data 308 from the first selector 208. Further, as shown in FIG. 4, the scrambled deserialized data 308 may be re-ordered by the second selector 212 to create the deserialized data 206. In this way, the second selector 212 may re-order the scrambled deserialized data 308 into the same order that the first selector 208 received the deserialized data 206 (as shown in FIG. 3). For example, as shown in FIG. 2, and according to the legend 216, the deserialized data 206 may be received by the first selector 208 in a particular order according to lane assignments determined by the transmitter 204. Further, the second selector 212 may then re-order the scrambled deserialized data 308 into the same particular order to create the deserialized data 206.

In some embodiments, and as shown in FIG. 4, the permutation shift orchestrator 202 may transmit lane permutations 210 to the second selector 212. Similar to the transmission of the lane permutations 210 to the first selector 208 (as shown in FIG. 3), the permutation shift orchestrator 202 may transmit the lane permutations 210 via a slow interface and select which lane permutation to use via a fast signal (e.g., a GPIO signal). The lane permutations 210 may configure the second switching element 402 to re-order the scrambled deserialized data 308 into the deserialized data 206. In this way, the second switching element 402 may be configured to reconfigure the lane assignments of the incoming scrambled deserialized data 308 and re-order them to re-create the deserialized data 206.

In other embodiments, the lane permutations may be selected by the switching algorithm 304, as shown in FIG. 4. The switching algorithm 304 may be the same switching algorithm 304 as shown in FIG. 3 that is associated with the first selector 208. In this way, the switching algorithm 304 may select from the lane permutations 210 to re-order the scrambled deserialized data 308 into the deserialized data 206 via the second switching element 402.

In some embodiments, and as shown in FIG. 2, the deserialized data 206 may be transmitted from the second selector 212 to a receiver 214. In some embodiments, the receiver 214 may include a transceiver, an optical transceiver, a receiver, an optical receiver, or the like.

In some embodiments, the first configuration may be a current configuration, and the permutation shift orchestrator 202 may be configured to configure the first selector 208 according to a new configuration, wherein the new configuration defines a new assignment of each data stream of the set of data streams to a corresponding lane of the plurality of lanes for transmission. Further, the permutation shift orchestrator 202 may configure the second selector 212 according to the new configuration, wherein the set of data streams transmitted via the plurality of lanes according to the new configuration of the first selector 208 is re-ordered via the second selector 212 configured according to the new configuration to form the deserialized data for serialization by the receiver 214.

In some embodiments, the permutation shift orchestrator 202 may delay the configuration of the first selector 208 according to the new configuration until a time at which the set of data streams transmitted according to the current configuration is re-ordered via the second selector 212 configured according to the current configuration. For example, as shown in FIG. 2, the permutation shift orchestrator 202 may transmit a delay 218 to the first selector 208. In some embodiments, the delay 218 may include delaying the changing the first selector's 208 configuration from the current configuration to the new configuration until a time at which the scrambled deserialized data 308 (e.g., the set of data streams transmitted according to the current configuration) is re-ordered via the second selector 212. In other words, and in some embodiments, the delay 218 may include pausing selection of a new lane permutation for the first selector 208 until the scrambled deserialized data 308 has been re-ordered to the deserialized data 206 via the second selector 212, as indicated by the second selector 212. In some embodiments, the delay 218 may cause a delay according to a passage of time, a response from the second selector 212, a response from the receiver 214, a signal from another device, or the like.

In some embodiments, in receipt of the data at the second selector 212, the permutation shift orchestrator 202 may be configured to direct transmission of a response signal from the second selector 212 to the first selector 208. For example, the second selector 212 may transmit a response, as directed by the permutation shift orchestrator 202, to indicate the data has been re-ordered into the deserialized data 206. In this example, the permutation shift orchestrator 202 may then configure the first selector 208 from the current configuration to the new configuration to scramble the next set of data streams. In an additional example, when the deserialized data 206 is received at the receiver 214, the receiver 214 may transmit a response to the transmitter 204, which may indicate the deserialized data 206 has been received. In some embodiments, the receiver 214 may transmit the response to the permutation shift orchestrator 202 or the first selector 208. In some embodiments, the response signal may be needed before additional data can be transferred. For example, the permutation shift orchestrator 202 may indefinitely pause configuring the first selector 208 if it does not receive a response signal from the second selector 212 and/or the receiver 214. In this example, without the response signal, the SerDES link may collapse due to backlog of data in the transfer queue. In some embodiments, after a collapse of the link, the link may automatically come back online upon a reconfiguration (e.g., changing configurations to a new configuration, a second configuration, a third configuration, and/or the like).

In cases where a third-party device is operatively coupled to the network and attempting to maliciously attack the data transfer, the response signal (or lack thereof) may indicate the third-party device is connected and reveal the location of the third-party device. In some embodiments, the permutation shift orchestrator 202 may be configured to determine that a third-party device is operatively coupled to the communication network based on the response signal received at the first selector 208. In some embodiments, and as shown in FIG. 5, a third-party device 516 may be operatively coupled to a network lane scrambling domain (e.g., the second network lane scrambling domain 514). The third-party device may be operatively coupled to the network through a variety of methods, including physically interfacing with the network. In this way, the response signal received at the permutation shift orchestrator 202, for example, may not be an expected response signal. If a third-party device is maliciously connected to the second network lane scrambling domain 514, it may not be transmitting the correct response signal to the permutation shift orchestrator 202, the first selector 208, third selector 506, or the transmitter 204.

In some embodiments, the permutation shift orchestrator 202 may be configured to determine a location of an operative coupling of the third-party device to the communication network (e.g., by triangulation). In this way, the location of the third-party device may be determined to be within a particular network lane scrambling domain. For example, as shown in FIG. 5, the third-party device 516 may be determined to be operatively coupled to the second network lane scrambling domain 514. In this example, the third selector 506 may be receiving inaccurate response signals, indicating the third-party device 516 is connected within its domain. Further, because the third selector 506 is receiving an inaccurate response signal, the location of the third-party device 516 may be determined to be within the second network lane scrambling domain 514.

In some embodiments, the permutation shift orchestrator may be configured to, upon a determination that the third-party device is operatively coupled to the communication network, cease transmission of data from the first selector to the second selector. In some embodiments, this may include ceasing transmission of data from the first selector 208 to the second selector 212. Further, in some embodiments, if a third-party device is determined to be operatively coupled to the network, the selectors may be configured from the first configuration to a second configuration, wherein the second configuration defines a new assignment of each data stream of the set of data streams to a corresponding lane of the plurality of lanes for transmission. In some embodiments, the permutation shift orchestrator 202 may reconfigure the first selector 208 and the second selector 212 to the second configuration. In some embodiments, the permutation shift orchestrator 202 may restart transmission of data from the first selector 208 to the second selector 212 via the plurality of lanes.

Further, in some embodiments, the configurations of the selectors may be changed from the current configuration to a new configuration based on a trigger. The trigger may include a determination that the third-party device is operatively coupled to the communication network, as discussed above. In some embodiments, the reconfiguration may be triggered by a passage of time. The passage of time may be a periodic passage of time, wherein the reconfiguration of the selectors is based on a certain amount of time. For example, on a periodic basis the first selector 208 and the second selector 212 may be reconfigured to the new configuration.

In some embodiments, the reconfiguration may be triggered by a triggering algorithm. The triggering algorithm may include a code-based program that may adjust the configuration of the selectors from the current configuration to the new configuration. The triggering algorithm may take into account variables, input, data, or the like to make a determination to reconfigure the lane assignments of the data streams. In this way, the triggering algorithm may receive input from devices, sensors, components, or the like to determine when reconfiguration is appropriate.

Figure 6:
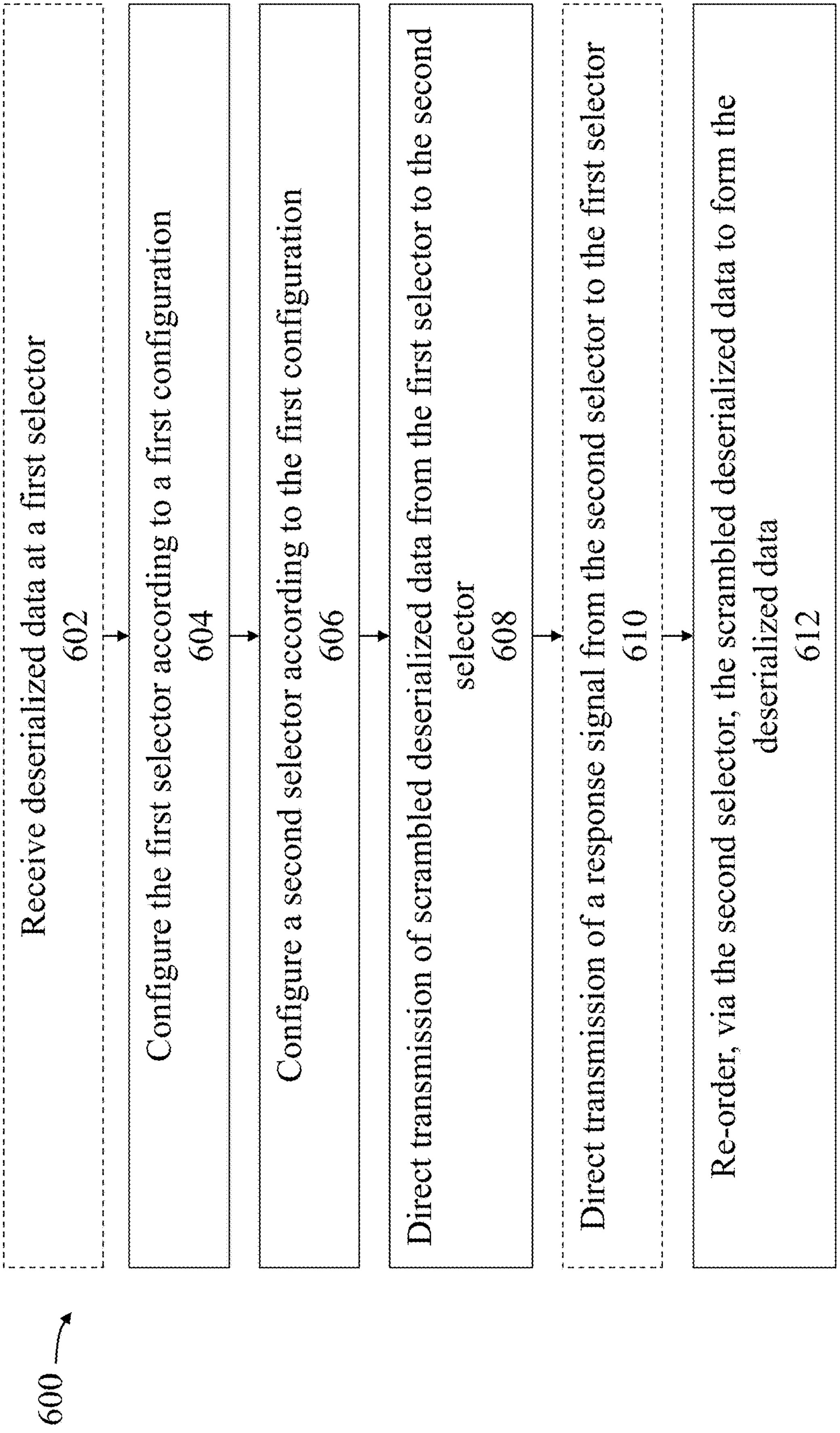
FIG. 6 is a process flow illustrating an example embodiment of a method for directing transmission of data from the first selector to the second selector, in accordance with some embodiments described herein.

In some embodiments, and as shown in FIG. 6, the present disclosure may include a method for directing transmission of data from the first selector (e.g., the first selector 208) to the second selector (e.g., the second selector 212) via a plurality of lanes. In some embodiments, the method may include, as discussed above, the steps performed by the processing circuitry of the apparatus as described herein. In some embodiments, and as shown in block 602, the method may include receiving deserialized data at a first selector. In some embodiments, the first selector (e.g., the first selector 208 in FIG. 2) may receive the deserialized data (e.g., the deserialized data 206) from a transmitter (e.g., the transmitter 204). In some embodiments, the method may further include, as shown in block 604, configuring the first selector 208 according to a first configuration. As mentioned above, the first configuration may define an assignment of each data stream of the set of data streams to a corresponding lane of a plurality of lanes for transmission.

Further, in some embodiments, the method may include, as shown in block 606, configuring a second selector 212 according to the first configuration. In some embodiments, as shown in block 608, the method may include directing transmission of scrambled deserialized data (e.g., the scrambled deserialized data 308 shown in FIG. 3) from the first selector 208 to the second selector 212. Further, in some embodiments, as shown in block 610, the method may include directing transmission of a response signal from the second selector 212 to the first selector 208. In some embodiments, as shown in block 612, the method may include re-ordering, via the second selector 212, the scrambled deserialized data 308 to form the deserialized data 206.

Further, the steps carried out by the processing circuitry of the apparatus as described herein may be performed by a system, such as the networking system 200. The networking system 200 may be used for directing transmission of data from a first selector (e.g., the first selector 208) to a second selector (e.g., the second selector 212) via a plurality of lanes. In some embodiments, the networking system 200 may include the first selector associated with a transmitter (e.g., the transmitter 204) operatively coupled to a communication network (e.g., the communication network 250 as described herein). Further, the networking system 200 may include the second selector 212 associated with a receiver (e.g., the receiver 214) operatively coupled to the communication network. Further, the networking system 200 may include a permutation shift orchestrator (e.g., the permutation shift orchestrator 202) operatively coupled to the communication network, wherein the permutation shift orchestrator 202 includes a processor (e.g., the processing circuitry 104) and a memory (e.g., the memory 114) including computer program code. In some embodiments, the memory and the computer program code may be configured to, with the processor, cause the permutation shift orchestrator to carry out the same or similar steps as described herein.

Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of any optical component or optoelectronic element. In addition, the methods described above may include fewer steps in some cases, while in other cases may include additional steps. The steps and modifications to the steps of the method described above, in some cases, may be performed in any order and in any combination.

Therefore, it is to be understood that the disclosure is not to be limited to the specific embodiments disclosed herein and that modifications and other embodiments are intended to be included within the scope of the appended claims. Although specific terms are employed herein, they are used in a generic and descriptive sense only and not for purposes of limitation.

What is claimed is:

1. An apparatus comprising:

a processing circuitry operatively coupled to a communication network and configured to communicate with a first selector associated with a transmitter and a second selector associated with a receiver via the communication network, wherein the first selector and the second selector are configured to direct transmission of data therebetween via a plurality of lanes, wherein the processing circuitry is further configured to:

configure the first selector according to a first configuration, wherein the transmitter is configured to transmit deserialized data to the first selector for transmission as a set of data streams to the second selector, and wherein the first configuration defines an assignment of each data stream of the set of data streams to a corresponding lane of a plurality of lanes for transmission; and configure the second selector according to the first configuration, wherein the set of data streams transmitted via the plurality of lanes according to the first configuration of the first selector is re-ordered via the second selector configured according to the first configuration to form the deserialized data for serialization by the receiver; and wherein the first configuration is a current configuration, wherein the processing circuitry is further configured to: configure the first selector according to a new configuration, wherein the new configuration defines a new assignment of each data stream of the set of data streams to a corresponding lane of the plurality of lanes for transmission; and configure the second selector according to the new configuration, wherein the set of data streams transmitted via the plurality of lanes according to the new configuration of the first selector is re-ordered via the second selector configured according to the new configuration to form the deserialized data for serialization by the receiver.

2. The apparatus according to claim 1, wherein the processing circuitry is further configured to delay configuration of the first selector according to the new configuration until a time at which the set of data streams transmitted according to the current configuration is re-ordered via the second selector configured according to the current configuration.

3. The apparatus according to claim 1, wherein the configuration of the first selector is changed from the current configuration to the new configuration based on a trigger, wherein the trigger comprises at least one of: a determination that a third-party device is operatively coupled to the communication network; a passage of time; or a triggering algorithm.

4. The apparatus according to claim 1, wherein the processing circuitry is further configured to: transmit a plurality of pre-computed lane permutations to the first selector, wherein the first selector is configured to store the plurality of pre-computed lane permutations; and transmit a selector signal to the first selector, wherein the selector signal indicates a pre-computed lane permutation from the plurality of pre-computed lane permutations for use as the first configuration.

5. The apparatus according to claim 4, wherein the plurality of pre-computed lane permutations is transmitted via a first signal type and the selector signal is transmitted via a second signal type.

6. The apparatus according to claim 1, wherein the first selector and the second selector comprise a switching algorithm, wherein the switching algorithm configures the first selector and the second selector according to the first configuration, and wherein the switching algorithm is stored in the first selector and in the second selector.

7. The apparatus according to claim 1, wherein, in response to receipt of the data at the second selector, the processing circuitry is configured to direct transmission of a response signal from the second selector to the first selector.

8. The apparatus according to claim 7, wherein the processing circuitry is further configured to determine that a third-party device is operatively coupled to the communication network based on the response signal received at the first selector.

9. The apparatus according to claim 8, wherein the processing circuitry is further configured to, upon a determination that the third-party device is operatively coupled to the communication network, cease transmission of data from the first selector to the second selector.

10. The apparatus according to claim 9, wherein the processing circuitry is further configured to: configure the first selector according to a second configuration, wherein the second configuration defines a new assignment of each data stream of the set of data streams to a corresponding lane of the plurality of lanes for transmission; configure the second selector according to the second configuration; and restart transmission of data from the first selector to the second selector via the plurality of lanes.

11. The apparatus according to claim 8, wherein the processing circuitry is further configured to determine a location of an operative coupling of the third-party device to the communication network.

12. The apparatus according to claim 1, wherein the plurality of lanes is provided via differential cable pairs, and wherein the differential cable pairs are reconfigurable during runtime of at least one of the first selector or the second selector.

13. The apparatus according to claim 1, wherein the plurality of lanes is provided via a fiber optic cable, and wherein the fiber optic cable is reconfigurable during runtime of at least one of the first selector or the second selector.

14. A method comprising: configuring a first selector associated with a transmitter according to a first configuration, wherein the transmitter is configured to transmit deserialized data to the first selector for transmission as a set of data streams to a receiver, and wherein the first configuration defines an assignment of each data stream of the set of data streams to a corresponding lane of a plurality of lanes for transmission; wherein data is transmitted from the first selector to a second selector via a plurality of lanes, and configuring a second selector associated with the receiver according to the first configuration, wherein the set of data streams transmitted via the plurality of lanes according to the first configuration of the first selector is re-ordered via the second selector configuration according to the first configuration to form the deserialized data for serialization by the receiver and;

wherein the first configuration is a current configuration, wherein the method further comprises: configuring the first selector according to a new configuration, wherein the new configuration defines a new assignment of each data stream of the set of data streams to a corresponding lane of the plurality of lanes for transmission; and configuring the second selector according to the new configuration, wherein the set of data streams transmitted via the plurality of lanes according to the new configuration of the first selector is re-ordered via the second selector configured according to the new configuration to form the deserialized data for serialization by the receiver.

15. The method according to claim 14, wherein the method further comprises delaying configuration of the first selector according to the new configuration until a time at which the set of data streams transmitted according to the current configuration is re-ordered via the second selector configuration according to the current configuration.

16. The method according to claim 14, wherein the configuration of the first selector is changed from the current configuration to the new configuration based on a trigger, wherein the trigger comprises at least one of: a determination that a third-party device is operatively coupled to the communication network; a passage of time; or a triggering algorithm.

17. The method according to claim 14, wherein the method further comprises: transmitting a plurality of pre-computed lane permutations to the first selector, wherein the first selector is configured to store the plurality of pre-computed lane permutations; and transmitting a selector signal to the first selector, wherein the selector signal indicates a pre-computed lane permutation from the plurality of pre-computed lane permutations for use as the first configuration.

18. The method according to claim 14, wherein the first selector and the second selector comprise a switching algorithm, wherein the switching algorithm configures the first selector and the second selector according to the first configuration, and wherein the switching algorithm is stored in the first selector and in the second selector.

19. The method according to claim 14, wherein, in response to receipt of the data at the second selector, the method further comprises: directing transmission of a response signal from the second selector to the first selector; determining that a third-party device is operatively coupled to the communication network based on the response signal received at the first selector; and ceasing transmission of data from the first selector to the second selector.

20. The method according to claim 19, wherein the method further comprises: configuring the first selector according to a second configuration, wherein the second configuration defines a new assignment of each data stream of the set of data streams to a corresponding lane of the plurality of lanes for transmission; configuring the second selector according to the second configuration; and restarting transmission of data from the first selector to the second selector via the plurality of lanes.

21. A system, the system comprising: a first selector associated with a transmitter operatively coupled to a communication network; a second selector associated with a receiver operatively coupled to the communication network; wherein the first selector and the second selector are configured to direct transmission of data therebetween via a plurality of lanes, and a permutation shift orchestrator (PSO) operatively coupled to the communication network, wherein the PSO comprises a processor and a memory including computer program code, the memory and the computer program code configured to, with the processor, cause the PSO to: configure the first selector according to a first configuration, wherein the transmitter is configured to transmit deserialized data to the first selector for transmission as a set of data streams to the second selector, and wherein the first configuration defines an assignment of each data stream of the set of data streams to a corresponding lane of a plurality of lanes for transmission; and configure the second selector according to the first configuration, wherein the set of data streams transmitted via the plurality of lanes according to the first configuration of the first selector is re-ordered via the second selector configured according to the first configuration to form the deserialized data for serialization by the receiver and;

wherein the first configuration is a current configuration, wherein the memory and the computer program code are configured to, with the processor, cause the PSO to: configure the first selector according to a new configuration, wherein the new configuration defines a new assignment of each data stream of the set of data streams to a corresponding lane of the plurality of lanes for transmission; and configure the second selector according to the new configuration, wherein the set of data streams transmitted via the plurality of lanes according to the new configuration of the first selector is re-ordered via the second selector configured according to the new configuration to form the deserialized data for serialization by the receiver.

22. The system according to claim 21, wherein the memory and the computer program code are configured to, with the processor, cause the PSO to delay configuration of the first selector according to the new configuration until a time at which the set of data streams transmitted according to the current configuration is re-ordered via the second selector configured according to the current configuration.

23. The system according to claim 21, wherein the configuration of the first selector is changed from the current configuration to the new configuration based on a trigger, wherein the trigger comprises at least one of: a determination that a third-party device is operatively coupled to the communication network; a passage of time; or a triggering algorithm.

24. The system according to claim 21, wherein the memory and the computer program code are configured to, with the processor, cause the PSO to: transmit a plurality of pre-computed lane permutations to the first selector, wherein the first selector is configured to store the plurality of pre-computed lane permutations; and transmit a selector signal to the first selector, wherein the selector signal indicates a pre-computed lane permutation from the plurality of pre-computed lane permutations for use as the first configuration.

25. The system according to claim 21, wherein the first selector and the second selector comprise a switching algorithm, wherein the switching algorithm configures the first selector and the second selector according to the first configuration, and wherein the switching algorithm is stored in the first selector and in the second selector.

26. The system according to claim 21, wherein, in response to receipt of the data at the second selector, the memory and the computer program code are configured to, with the processor, cause the PSO to: direct transmission of a response signal from the second selector to the first selector; determine that a third-party device is operatively coupled to the communication network based on the response signal received at the first selector; and cease transmission of data from the first selector to the second selector.

27. The system according to claim 26, wherein the memory and the computer program code are configured to, with the processor, cause the PSO to: configure the first selector according to a second configuration, wherein the second configuration defines a new assignment of each data stream of the set of data streams to a corresponding lane of the plurality of lanes for transmission; configure the second selector according to the second configuration; and restart transmission of data from the first selector to the second selector via the plurality of lanes.

28. An optical network comprising:

at least one optical transmitter element;

at least one optical receiver element;

at least one optical switch disposed in an optical path between the at least one optical transmitter element and the at least one optical receiver element, wherein the at least one optical switch is configured to communicate with a permutation shift orchestrator, and wherein the permutation shift orchestrator is configured to:

configure the optical switch according to a first configuration, wherein the optical transmitter element is configured to transmit deserialized data to the optical switch for transmission as a set of data streams, wherein the first configuration defines an assignment of each data stream of the set of data streams to a corresponding lane of a plurality of lanes for transmission and;

wherein the first configuration is a current configuration, wherein the permutation shift orchestrator is further configured to: configure the optical switch according to a new configuration, wherein the new configuration defines a new assignment of each data stream of the set of data streams to a corresponding lane of the plurality of lanes for transmission, wherein the set of data streams is transmitted via the plurality of lanes according to the new configuration of the optical switch.

29. The optical network according to claim 28, wherein the permutation shift orchestrator is further configured to delay configuration of the optical switch according to the new configuration until a time at which the set of data streams transmitted according to the current configuration is received at the optical receiver element.

30. The optical network according to claim 28, wherein the configuration of the optical switch is changed from the current configuration to the new configuration based on a trigger, wherein the trigger comprises at least one of: a determination that a third-party device is operatively coupled to the optical network; a passage of time; or a triggering algorithm.

31. The optical network according to claim 28, wherein the permutation shift orchestrator is further configured to: transmit a plurality of pre-computed lane permutations to the optical switch, wherein the optical switch is configured to store the plurality of pre-computed lane permutations; and transmit a selector signal to the optical switch, wherein the selector signal indicates a pre-computed lane permutation from the plurality of pre-computed lane permutations for use as the first configuration.

* * * * *